United States Patent
Toyoda et al.

(10) Patent No.: US 9,917,287 B2
(45) Date of Patent: Mar. 13, 2018

(54) SECONDARY-BATTERY POROUS MEMBRANE COMPOSITION, SECONDARY-BATTERY POROUS MEMBRANE AND SECONDARY BATTERY

(71) Applicant: ZEON CORPORATION, Chiyoda-ku, Tokyo (JP)

(72) Inventors: Yujiro Toyoda, Tokyo (JP); Hiromi Takamatsu, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 19 days.

(21) Appl. No.: 15/114,949

(22) PCT Filed: Feb. 3, 2015

(86) PCT No.: PCT/JP2015/053010
§ 371 (c)(1),
(2) Date: Jul. 28, 2016

(87) PCT Pub. No.: WO2015/122322
PCT Pub. Date: Aug. 20, 2015

(65) Prior Publication Data
US 2016/0344007 A1    Nov. 24, 2016

(30) Foreign Application Priority Data
Feb. 14, 2014 (JP) ................. 2014-026775

(51) Int. Cl.
| | |
|---|---|
| H01M 2/16 | (2006.01) |
| H01M 2/14 | (2006.01) |
| C08J 7/04 | (2006.01) |
| C09D 133/26 | (2006.01) |
| C08J 9/00 | (2006.01) |
| H01M 10/0525 | (2010.01) |

(52) U.S. Cl.
CPC .......... *H01M 2/1653* (2013.01); *C08J 7/047* (2013.01); *C08J 9/0066* (2013.01); *C09D 133/26* (2013.01); *H01M 2/145* (2013.01); *H01M 2/166* (2013.01); *C08J 2323/06* (2013.01); *C08J 2333/26* (2013.01); *C08J 2433/02* (2013.01); *C08J 2433/26* (2013.01); *H01M 10/0525* (2013.01)

(58) Field of Classification Search
CPC ............ H01M 10/0525; H01M 2/1686; C08F 220/56; C08L 2203/20
See application file for complete search history.

(56) References Cited

U.S. PATENT DOCUMENTS

| | | | |
|---|---|---|---|
| 6,458,386 B1 * | 10/2002 | Schacht ................ | A61L 15/225 424/426 |
| 2007/0238805 A1 * | 10/2007 | Maeda ............... | C08G 18/6266 522/109 |
| 2014/0308565 A1 * | 10/2014 | Lee ..................... | H01M 2/1686 429/144 |
| 2015/0038613 A1 * | 2/2015 | Sun ......................... | A61L 27/52 523/113 |
| 2016/0293998 A1 * | 10/2016 | Moreau ............. | H01M 10/0525 |
| 2016/0344007 A1 * | 11/2016 | Toyoda ................. | H01M 2/145 |
| 2017/0101558 A1 * | 4/2017 | Nakashima ............ | C09J 109/04 |
| 2017/0155113 A1 * | 6/2017 | Hashiwaki ........... | H01M 2/1653 |
| 2017/0190844 A1 * | 7/2017 | Zeng ..................... | C08G 81/025 |
| 2017/0279152 A1 * | 9/2017 | Toyoda ............. | H01M 10/0525 |
| 2017/0309916 A1 * | 10/2017 | Toyoda ................. | H01M 4/622 |

FOREIGN PATENT DOCUMENTS

| | | |
|---|---|---|
| CN | 103102717 A | 5/2013 |
| WO | 2013125645 A1 | 8/2013 |

OTHER PUBLICATIONS

Aug. 16, 2016, International Preliminary Report on Patentability issued in the International Patent Application No. PCT/JP2015/053010.

* cited by examiner

*Primary Examiner* — Michael A Salvitti
(74) *Attorney, Agent, or Firm* — Kenja IP Law PC

(57) ABSTRACT

A composition for a porous membrane of a secondary battery including a non-conductive particle and a water-soluble polymer, wherein the water-soluble polymer contains 80% by weight or more of a (meth)acrylamide monomer unit, and the water-soluble polymer has a storage modulus at 150° C. of $2.0\times10^5$ Pa or more; and a porous membrane manufactured therefrom and a secondary battery including the same.

6 Claims, No Drawings

SECONDARY-BATTERY POROUS MEMBRANE COMPOSITION, SECONDARY-BATTERY POROUS MEMBRANE AND SECONDARY BATTERY

FIELD

The present invention relates to a composition for porous membranes of secondary batteries, a porous membrane for secondary batteries, and a secondary battery.

BACKGROUND

Secondary batteries are widely used in recent years as a power source of portable devices. In particular, lithium ion secondary batteries can be small in size and low in weight, have a high energy density, and can be repeatedly charged and discharged. On the basis of such properties, lithium ion secondary batteries are expected to grow in demand. Such lithium ion secondary batteries are utilized in apparatuses such as cellular phones and notebook personal computers, taking advantage of their high energy density. Since the apparatuses to which secondary batteries are applied have been improved in performance, secondary batteries are demanded to be further improved in performance. For example, secondary batteries are demanded to have improved performances such as an ability to maintain their capacity even after charge and discharge are repeated in a high-temperature environment (high-temperature cycle property).

A secondary battery is provided with a separator between a positive electrode and a negative electrode in order to improve performances. As the separator, there is known a porous membrane obtained by applying a layer of a slurry containing non-conductive particles onto a substrate and then drying the obtained layer. As such a slurry, a so-called aqueous slurry prepared by using water as a solvent is becoming widespread in order to, for example, reduce load on the environment (Patent Literature 1). Such a slurry can be prepared with physical properties such as viscosity falling within preferable ranges, whereby favorable application and facilitated manufacturing of a high-quality porous membrane can be performed. For adjusting such physical properties, a cellulose-based polymer such as carboxymethyl cellulose (CMC), for example, is often added to such a slurry.

CITATION LIST

Patent Literature

Patent Literature 1: International Publication No. WO2013/125645

SUMMARY

Technical Problem

However, a cellulose-based polymer such as carboxymethyl cellulose has high hydrophilicity. Therefore, there is a problem that the polymer increases the content of moisture remaining in a porous membrane after the slurry layer has been dried. Such a high content of moisture remaining in a porous membrane causes deterioration of the aforementioned performance of a secondary battery.

Therefore, an object of the present invention is to provide a composition for porous membranes of secondary batteries which has a low residual moisture content, enables application to be easily performed, and allows for manufacture of a porous membrane capable of functioning as a separator that can improve battery performances such as high-temperature cycle property.

A further object of the present invention is to provide: a porous membrane which has a low residual moisture content, can be easily manufactured, and can function as a separator capable of improving battery performances such as high-temperature cycle property; and a secondary battery including such a porous membrane.

Solution to Problem

The present inventor has conducted research in order to achieve the above-described objects. Then, the present inventor focused on a polymer containing a polymer unit of acrylamide as an additive in an aqueous slurry for porous membranes. Thus, the present inventor has found out that when the ratio of an acrylamide-based polymer unit in such a polymer and the storage modulus of the polymer fall within predetermined ranges, a residual moisture content can be reduced, physical properties that facilitate application can be imparted to a slurry, and effects such as imparting of halogen trapping capabilities and reduction of thermal shrinkage of a separator can be exerted. As a result, battery performances such as high-temperature cycle property can be improved. Thus, the present invention has been accomplished. That is, according to the present invention, the following (1) to (6) are provided.

(1) A composition for a porous membrane of a secondary battery, comprising a non-conductive particle and a water-soluble polymer, wherein
  the water-soluble polymer contains 80% by weight or more of a (meth)acrylamide monomer unit, and
  the water-soluble polymer has a storage modulus at 150° C. of $2.0 \times 10^5$ Pa or more.

(2) The composition for a porous membrane of a secondary battery according to (1), wherein a glass transition temperature obtained by measuring dynamic viscoelasticity of the water-soluble polymer is 150 to 200° C.

(3) The composition for a porous membrane of a secondary battery according to (1) or (2), wherein the water-soluble polymer has a weight average molecular weight of $2.0 \times 10^5$ to $1.00 \times 10^6$.

(4) The composition for a porous membrane of a secondary battery according to any one of (1) to (3), wherein the water-soluble polymer contains an acid group-containing monomer unit.

(5) A porous membrane for a secondary battery, obtained by forming a layer of the composition for a porous membrane of a secondary battery according to any one of (1) to (4), and drying the formed layer.

(6) A secondary battery comprising the porous membrane for a secondary battery according to (5).

Advantageous Effects of Invention

The composition for porous membranes of secondary batteries according to the present invention has a low residual moisture content, enables application to be easily performed, and is useful as a material of the porous membrane according to the present invention capable of functioning as a separator that has excellent thermal shrinkage resistance and halogen trapping capabilities and can improve battery performances such as high-temperature cycle property. The secondary battery according to the present invention includes the porous membrane according to the present invention, and is therefore excellent in performance such as high-temperature cycle property.

DESCRIPTION OF EMBODIMENTS

Hereinafter, the present invention will be described in detail by illustrating embodiments and examples. The present invention is not limited to the following embodiments and examples, but it may be optionally modified for implementation within the scope not departing from the claims of the present invention and equivalents thereto.

As described herein, the term "(meth)acryl-" means both or one of acryl- and methacryl-. For example, (meth)acrylamide means acrylamide, methacrylamide, or a combination thereof. The term "(meth)acryloyl" means acryloyl, methacryloyl, or a combination thereof.

1. Composition for Porous Membranes

The composition for porous membranes of secondary batteries according to the present invention (hereinafter, sometimes referred to as a "composition for porous membranes") includes non-conductive particles and a specific water-soluble polymer. Usually, the composition for porous membranes further includes water.

1.1. Non-Conductive Particle

The non-conductive particle is a component that is filled in the porous membrane, and spaces between the non-conductive particles can form pores in the porous membrane. The non-conductive particle has non-conductivity, thereby allowing the porous membrane to become insulated. Therefore, a short circuit in secondary batteries can be prevented. Furthermore, the non-conductive particle usually has high rigidity, thereby enabling the porous membrane to have improved mechanical strength. For this reason, even when heat causes stress that forces a substrate such as a separator substrate to shrink, the porous membrane can resist the stress. Therefore, a short circuit due to the shrinkage of the substrate can be prevented.

The non-conductive particle may be an inorganic particle or an organic particle.

An inorganic particle is usually excellent in dispersion stability in water, and is unlikely to precipitate in the composition for porous membranes, so that a uniform slurry state can be maintained for an extended period. Furthermore, the use of an inorganic particle usually enables the porous membrane to have improved heat resistance.

As a material of the non-conductive particle, an electrochemically stable material is preferable. From such a viewpoint, preferable examples of the inorganic material for the non-conductive particles include: particles of oxide such as aluminum oxide (alumina), a hydrate of aluminum oxide (boehmite (AlOOH) and gibbsite ($Al(OH)_3$)), bakelite, iron oxide, silicon oxide, magnesium oxide (magnesia), magnesium hydroxide, calcium oxide, titanium oxide (titania), $BaTiO_3$, ZrO, and alumina-silica composite oxide; particles of nitride such as aluminum nitride, silicon nitride, and boron nitride; particles of covalent crystal such as silicon and diamond; particles of poorly-soluble ionic crystal such as barium sulfate, calcium fluoride, and barium fluoride; and clay fine particles such as silica, talc, and montmorillonite.

Among these, from the viewpoint of excellent heat resistance (for example, resistance to high temperatures of 180° C. or higher), alumina, boehmite, and barium sulfate are preferable, and alumina and barium sulfate are more preferable. Furthermore, from the viewpoint of low water absorbability or the like, barium sulfate is particularly preferable.

As the organic particle, a particle of a polymer is usually used. By adjusting the type and amount of a functional group on a surface of the organic particle, compatibility of the organic particle to water can be controlled, and thus the content of moisture in the porous membrane can be controlled. Furthermore, usually the organic particle is excellent in reduced elution of metal ions.

Examples of the polymer that forms the non-conductive particle may include a variety of polymer compounds such as polystyrene, polyethylene, polyimide, a melamine resin, a phenolic resin, and an acrylic resin. The aforementioned polymer compounds that form the particle may be a homopolymer or a copolymer. In the case of a copolymer, any of a block copolymer, a random copolymer, a graft copolymer and an alternating copolymer may be used. Furthermore, the copolymer may be partly modified or crosslinked. A mixture of these may also be used. In a case of a crosslinked copolymer, examples of a crosslinking agent may include a crosslinking body having an aromatic ring such as divinyl benzene, a multifunctional acrylate crosslinking body such as ethylene glycol dimethacrylate, and a crosslinking body having an epoxy group such as glycidyl acrylate and glycidyl methacrylate.

When an organic particle is used as the non-conductive particle, usually the organic particle is a article of a polymer that does not have a glass transition temperature or a particle of a polymer that has a high glass transition temperature. When the polymer has a glass transition temperature, its glass transition temperature is preferably 150° C. or higher, more preferably 200° C. or higher, and particularly preferably 250° C. or higher, and is usually 500° C. or lower.

The manufacturing method of the organic particle as the non-conductive particle is not particularly limited, and examples thereof may include a solution polymerization method, a suspension polymerization method, and an emulsion polymerization method. Among these, an emulsion polymerization method and a suspension polymerization method are preferable, since polymerization can be performed in water and the obtained product can be used as a material of the composition for porous membranes as it is. When manufacturing the organic particle, the reaction system thereof preferably contains a dispersant. The organic particle is usually formed from a polymer that substantially constitutes the organic particle, but may also further contain an optional component such as an additive added in polymerization.

The non-conductive particle may be subjected to, for example, element substitution, surface treatment, and solid solution formation, as necessary. With regard to the non-conductive particle, one of the aforementioned materials may be contained in one particle, and two or more thereof may also be contained in combination at any ratio in one particle. Furthermore, the non-conductive particle to be used may be a combination of two or more types of particles formed of materials different from each other.

The non-conductive particle may have a shape of, for example, a sphere, an ellipse, a polygon, tetrapod (registered trademark), a plate, and a scale. Among these, in order to increase porosity of the porous membrane for suppressing reduction of ion conductivity by the porous membrane, the shape is preferably tetrapod (registered trademark), a plate, and a scale.

The specific surface area of the non-conductive particle is preferably 0.5 m²/g or more, more preferably 1 m²/g or more, and further more preferably 2 m²/g or more, and is preferably 75 m²/g or less, more preferably 25 m²/g or less, and further more preferably 10 m²/g or less. When the specific surface area of the non-conductive particle is equal to or more than the aforementioned lower limit, the filling factor of the porous membrane is increased with a small particle size, so that the thermal shrinkage resistance becomes favorable. When the specific surface area of the non-conductive particle is equal to or less than the aforementioned upper limit, the moisture content adsorbed to the porous membrane can be suppressed to be a low value.

The volume average particle size of the non-conductive particle is preferably 0.01 µm or more, and more preferably 0.1 µm or more, and is preferably 1 µm or less. When the volume average particle size of the non-conductive particle is equal to or less than the upper limit of the aforementioned range, the filling factor of the porous membrane is increased with a small particle size, so that the thermal shrinkage resistance becomes favorable. Here, the volume average particle size of a particle is a particle size at a cumulative volume calculated from the small diameter side of 50% in a particle size distribution measured by a laser diffraction method.

1.2. Water-Soluble Polymer (A)

The composition for porous membranes according to the present invention includes a specific water-soluble polymer containing a (meth)acrylamide monomer unit. In the following, this specific water-soluble polymer is sometimes referred to as a water-soluble polymer (A).

The water-soluble polymer (A) is a water-soluble polymer. The water-soluble polymer refers to a polymer that causes less than 1.0% by weight of insoluble matter when 0.5 g of the polymer is dissolved in 100 g of water at 25° C. Such a water-soluble polymer may be obtained by appropriately adjusting the ratio of each monomer unit that is a component of the polymer. The water-soluble polymer (A) can exert an action of binding the non-conductive particles to each other by lying between the non-conductive particles in the porous membrane as well as an action of binding the porous membrane and the separator substrate or the polar plate by lying between the non-conductive particle and the separator substrate or the polar plate.

1.2.1. Water-Soluble Polymer (A): (meth)acrylamide Monomer Unit

The water-soluble polymer (A) contains a (meth)acrylamide monomer unit. The (meth)acrylamide monomer unit is a structural unit having a structure that is formed by polymerization of a (meth)acrylamide monomer.

As the composition for porous membranes according to the present invention includes the water-soluble polymer (A) containing the (meth)acrylamide monomer unit, physical properties such as viscosity of the composition for porous membranes can be confined within the range suitable for applying, and the residual moisture content in the porous membrane can be reduced. In addition, effects such as imparting of halogen trapping capability and reduction of thermal shrinkage of a separator by (meth)acrylamide can be exerted, resulting in improvement of battery performances such as high-temperature cycle property.

Examples of the (meth)acrylamide monomer may include acrylamide, methacrylamide, and a mixture thereof.

The ratio of the (meth)acrylamide monomer unit in the water-soluble polymer (A) is 80% by weight or more, preferably 82% by weight or more, and more preferably 85% by weight or more, and is preferably 99% by weight or less, and more preferably 95% by weight or less. When the ratio of the (meth)acrylamide monomer unit is equal to or more than the aforementioned lower limit, the function of trapping impurities such as halogen by an amide group can be effectively exerted. When the ratio of the (meth)acrylamide monomer unit is equal to or less than the aforementioned upper limit, the glass transition temperature and the storage modulus of the water-soluble polymer (A) can be adjusted to a desired high value, so that favorable thermal shrinkage resistance can be obtained.

1.2.2. Water-Soluble Polymer (A): Acid Group-Containing Monomer Unit

The water-soluble polymer (A) preferably contains an acid group-containing monomer unit. The acid group-containing monomer unit is a structural unit having a structure that is formed by polymerization of an acid group-containing monomer. The acid group-containing monomer is a monomer containing an acid group.

Examples of the acid group may include a —COOH group (a carboxylic acid group); a —SO$_3$H group (a sulfonic acid group); a phosphonic acid group such as a —PO$_3$H$_2$ group and a —PO(OH)(OR) group (R represents a hydrocarbon group); and a combination thereof. Therefore, examples of the acid group-containing monomer may include monomers having these acid groups. Further examples of the acid group-containing monomer may include monomers that can generate the aforementioned acid groups through hydrolysis. Specific examples of such an acid group-containing monomer may include an acid anhydride that can generate a carboxylic acid group through hydrolysis.

Examples of the monomer having a carboxylic acid group (a carboxylic acid monomer) may include mono-carboxylic acid, dicarboxylic acid, an anhydride of dicarboxylic acid, and a derivative thereof. Examples of mono-carboxylic acid may include acrylic acid, methacrylic acid, crotonic acid, 2-ethylacrylic acid, and isocrotonic acid. Examples of dicarboxylic acid may include maleic acid, fumaric acid, itaconic acid, and methylmaleic acid. Examples of an acid anhydride of dicarboxylic acid may include maleic anhydride, acrylic anhydride, methylmaleic anhydride, and dimethylmaleic anhydride. Among these, mono-carboxylic acid is preferable, and acrylic acid and methacrylic acid are more preferable.

Examples of a monomer having a sulfonic acid group (a sulfonic acid monomer) may include vinylsulfonic acid, methylvinylsulfonic acid, (meth)allylsulfonic acid, styrenesulfonic acid, ethyl (meth)acrylic acid-2-sulfonate, 2-acrylamide-2-methylpropanesulfonic acid, 3-allyloxy-2-hydroxypropanesulfonic acid, and 2-(N-acryloyl)amino-2-methyl-1,3-propane-disulfonic acid. Among these, 2-acrylamide-2-methylpropanesulfonic acid is preferable.

Examples of a monomer having a phosphonic acid group (a phosphonic acid monomer) may include 2-(meth)acryloyloxyethyl phosphate, methyl-2-(meth)acryloyloxyethyl phosphate, and ethyl-(meth) acryloyloxyethyl phosphate.

Furthermore, salts of the aforementioned monomers may also be used as the acid group-containing monomer. Examples of such salts may include sodium salt of styrenesulfonic acid such as p-styrenesulfonic acid.

As the acid group-containing monomers and the acid group-containing monomer units, one type thereof may be solely used, and two or more types thereof may also be used in combination at any ratio.

Although an acid group may be introduced through polymerization of the aforementioned acid group-containing monomers, it may also be introduced by polymerizing a water-soluble polymer that does not have an acid group and thereafter substituting a part or all of functional groups in the water-soluble polymer with an acid group. A repeating unit in the water-soluble polymer (A) having the acid group that has been introduced in this manner is also included in the acid group-containing monomer unit.

The ratio of the acid group-containing monomer unit in the water-soluble polymer (A) is preferably 0.1% by weight or more, more preferably 0.5% by weight or more, and further more preferably 1% by weight or more, and is preferably 20% by weight or less, more preferably 15% by weight or less, and further more preferably 12% by weight or less. When the ratio of the acid group-containing monomer unit in the water-soluble polymer (A) is equal to or more than the aforementioned lower limit, electrostatic repulsion effects by anions can be obtained, and a slurry can have improved preservation stability. When the ratio of the acid group-containing monomer unit in the water-soluble polymer (A) is equal to or less than the aforementioned upper limit, the adsorbed moisture can be reduced to a desired low value, so that the moisture content in the porous membrane can be reduced. In addition, the glass transition temperature and the storage modulus of the water-soluble polymer (A) can be adjusted to a desired high value, so that favorable thermal shrinkage resistance can be obtained.

1.2.3. Water-Soluble Polymer (A): Crosslinkable Monomer Unit

The water-soluble polymer (A) preferably contains a crosslinkable monomer unit. The crosslinkable monomer unit is a structural unit having a structure that is obtained by polymerization of a crosslinkable monomer. The crosslinkable monomer is a monomer that can form a crosslinked structure by heating or irradiation with energy rays during or after polymerization. The inclusion of the crosslinkable monomer unit enables physical properties such as storage modulus of the water-soluble polymer (A) to be adjusted within a desired range, so that effects such as improved thermal shrinkage resistance can be obtained.

Examples of the crosslinkable monomer as a material of the water-soluble polymer (A) may include crosslinkable monomers used in the later-described particulate polymer, and N-substituted (meth)acrylamide such as dimethylacrylamide. Among these, N-substituted (meth)acrylamide such as dimethylacrylamide is preferable.

As the crosslinkable monomer units, one type thereof may be solely used, and two or more types thereof may also be used in combination at any ratio.

The ratio of the crosslinkable monomer unit in the water-soluble polymer (A) is preferably 0.1% by weight or more, more preferably 0.5% by weight or more, and further more preferably 1.0% by weight or more, and is preferably 5.0% by weight or less, more preferably 3.0% by weight or less, and further more preferably 2.0% by weight or less. When the ratio of the crosslinkable monomer unit in the water-soluble polymer (A) is equal to or more than the aforementioned lower limit, the storage modulus can be a desired high value, so that favorable thermal shrinkage resistance can be obtained. When the ratio of the crosslinkable monomer unit in the water-soluble polymer (A) is equal to or less than the aforementioned upper limit, excessive increase in molecular weight due to the formation of crosslinks can be suppressed, the viscosity of a slurry of the composition for porous membranes can be maintained at an appropriately low value, and applying the slurry can be easily performed.

1.2.4. Water-Soluble Polymer (A): Other Units

The water-soluble polymer (A) may contain an optional structural unit other than the aforementioned structural units. Examples of the optional structural unit that may be contained in the water-soluble polymer (A) may include an ester of (meth)acrylic acid and tertiary amino alcohol such as dimethylaminoethyl acrylate and dimethylaminopropyl acrylate, and examples that are the same as the examples described later as the structural unit that can be contained in a particulate binder, other than the aforementioned monomer units. One type thereof may be solely used, and two or more types thereof may also be used in combination at any ratio.

1.2.5. Properties of Water-Soluble Polymer (A)

The storage modulus at 150° C. of the water-soluble polymer (A) is $2.0 \times 10^5$ Pa or more, preferably $3.0 \times 10^5$ Pa or more, and further preferably $4.0 \times 10^5$ Pa or more. The upper limit of the storage modulus is preferably $1.0 \times 10^7$ Pa or less.

The storage modulus of the water-soluble polymer (A) is obtained by the following measurement method. First, an aqueous solution of the water-soluble polymer is dried at room temperature in a state of being placed in an appropriate container, thereby to form a film with a thickness of 0.5 mm. The film is punched into a circular shape with a diameter of 8 mm to be used as a sample piece. Using an apparatus for measuring dynamic viscoelasticity, the sample piece is distorted with a frequency of 1 Hz, and measured for dynamic viscoelasticity while increasing the temperature within a temperature range of 25° C. to 200° C. at a temperature increasing rate of 10° C./min. On the basis of this measurement result, the storage modulus is obtained. As the apparatus for measuring dynamic viscoelasticity, product name "MCR300" manufactured by Anton Paar may be used.

When the storage modulus of the water-soluble polymer (A) is equal to or more than the aforementioned lower limit, favorable thermal shrinkage resistance can be obtained. On the other hand, when the storage modulus of the water-soluble polymer (A) is equal to or less than the aforementioned upper limit, flexibility can be imparted to the porous membrane, enabling the occurrence probability of cracking to decrease even when the porous membrane is thick.

The glass transition temperature of the water-soluble polymer (A) is preferably 150° C. or higher, more preferably 155° C. or higher, further preferably 160° C. or higher, and particularly preferably 165° C. or higher, and is preferably 200° C. or lower. As the glass transition temperature, a value obtained from the measurement result of dynamic viscoelasticity may be used.

When the glass transition temperature of the water-soluble polymer (A) is equal to or more than the aforementioned lower limit, the storage modulus can be adjusted to a desired high value, so that favorable thermal shrinkage resistance can be obtained. When the glass transition temperature of the water-soluble polymer (A) is equal to less than the aforementioned upper limit, flexibility can be imparted to the porous membrane.

The weight average molecular weight of the water-soluble polymer (A) is preferably $2.0 \times 10^5$ or more, more preferably $2.5 \times 10^5$ or more, and further more preferably $3.0 \times 10^5$ or more, and is preferably $1.00 \times 10^6$ or less, more preferably $7.0 \times 10^5$ or less, and further more preferably $6.0 \times 10^5$ or less. When the weight average molecular weight of the water-soluble polymer (A) is equal to or more than the aforementioned lower limit, the viscosity of the slurry of the composition for porous membranes can be maintained at an appropriately high value, so that the slurry can be prevented from dripping to cause unevenness during application. When the weight average molecular weight of the water-soluble polymer (A) is equal to or less than the aforementioned upper limit, the viscosity of the slurry of the composition for porous membranes is maintained at an appropriately low value, and the layer of the composition for porous membranes is leveled after applying the composition for porous membranes. As a result, undesired streaks formed by application can be reduced.

The storage modulus and the glass transition temperature of the water-soluble polymer (A) can be confined within the aforementioned desired ranges by appropriately adjusting the type and ratio of the constituent monomer and/or the molecular weight or the like of the polymer.

1.2.6. Content Ratio of Water-Soluble Polymer (A)

The content ratio of the water-soluble polymer (A) in the composition for porous membranes according to the present invention relative to 100 parts by weight of the non-conductive particles is preferably 0.1 parts by weight or more, more preferably 0.5 parts by weight or more, and further more preferably 1.0 part by weight or more, and is preferably 5 parts by weight or less, more preferably 4 parts by weight or less, and further more preferably 3 parts by weight or less. When the content ratio of the water-soluble polymer (A) falls within the range, the aforementioned effects of the water-soluble polymer (A) can be favorably obtained.

1.2.7. Manufacturing Method of Water-Soluble Polymer (A)

The water-soluble polymer (A) may be manufactured by, for example, polymerizing a monomer composition containing the aforementioned monomers in an aqueous solvent. At this time, the ratio of each monomer in the monomer composition is usually set to the same ratio as that of each structural unit in the water-soluble polymer (A).

As the aqueous solvent, a solvent in which the water-soluble polymer (A) can be dispersed may be used. Usually, the aqueous solvent is selected from aqueous solvents having a boiling point under normal pressure of preferably 80° C. or higher, and more preferably 100° C. or higher, and is preferably 350° C. or lower, and more preferably 300° C. or lower. Examples of the aqueous solvent may be the same as the examples of the aqueous solvent used for manufacture of the particulate binder. Among these, water is particularly preferable, because it is not combustible, and a dispersion of the polymer can be easily obtained. An aqueous solvent other than water may also be used together with water used as a main solvent, as long as the dispersed state of the polymer can be ensured.

Examples of the polymerization method may include, but not particularly limited to, a solution polymerization method, a suspension polymerization method, a bulk polymerization method, and an emulsion polymerization. The reaction form of polymerization may be any of ion polymerization, radical polymerization, and living radical polymerization. Among these, emulsion polymerization is particularly preferable from the viewpoint of manufacturing efficiency. For example, a high-molecular weight body is easily obtained. Furthermore, since a polymer product is obtained in a state of being dispersed in water as it is, re-dispersion treatment is not necessary, and the obtained polymer product can be used as it is for the manufacture of the composition for porous membranes. The emulsion polymerization can be performed in accordance with a method known per se in the art.

As additives such as emulsifiers, dispersants, polymerization initiators, and polymerization auxiliaries used in the polymerization, commonly used additives may be used. The amounts of these additives for use may also be commonly used amounts. The polymerization conditions may be appropriately adjusted depending on the types of the polymerization method and the polymerization initiator, and the like.

1.3. Particulate Binder

The composition for porous membranes according to the present invention may include a particulate binder in addition to the water-soluble polymer (A). The particulate binder may be particles of a polymer containing an acid group. The inclusion of the particulate binder in the composition for porous membranes usually provides the following advantages. That is, the binding property of the porous membrane improves, and the strength against mechanical forces applied to a separator or electrode including the porous membrane for secondary batteries according to the present invention during handling such as winding and transportation can be improved. Furthermore, since the particulate binder is in a shape of particles, binding thereof to the non-conductive particle in the porous membrane is effected not over an area but at a point. This enables pores in the porous membrane to increase in size, thereby allowing a secondary battery to have reduced internal resistance.

The particulate binder is usually water-insoluble. Therefore, the particulate binder can usually exist in a state of being dispersed while keeping a shape of particles in an aqueous composition for porous membranes. The particulate binder can exist in the porous membrane with a part or all of the shape of particles maintained. Such a particulate polymer may be obtained by appropriately adjusting the ratio of each monomer unit that is a component.

When the particulate binder contains an acid group-containing monomer unit, it can become a particulate binder containing an acid group. The acid group-containing monomer unit in the particulate binder is a structural unit having a structure that is formed by polymerization of an acid group-containing monomer. The acid group-containing monomer is a monomer containing an acid group. Therefore, the particulate binder having the acid group-containing monomer unit contains an acid group.

Examples of the acid group that may be contained in the particulate binder may include a —COOH group (a carboxylic acid group); a —SO$_3$H group (a sulfonic acid group); a phosphonic acid group such as a —PO$_3$H$_2$ group and —PO(OH)(OR) group (R represents a hydrocarbon group); and a combination thereof. Therefore, examples of the acid group-containing monomer may include monomers having these acid groups. Further examples of the acid group-containing monomer may include monomers that can generate the aforementioned acid groups through hydrolysis. Specific examples of such an acid group-containing monomer may include an acid anhydride that can generate a carboxylic acid group through hydrolysis.

Examples of a monomer having a carboxylic acid group (a carboxylic acid monomer) may include mono-carboxylic acid, dicarboxylic acid, an anhydride of dicarboxylic acid, and a derivative thereof. Examples of mono-carboxylic acid may include acrylic acid, methacrylic acid, crotonic acid, 2-ethylacrylic acid, and isocrotonic acid. Examples of dicarboxylic acid may include maleic acid, fumaric acid, itaconic acid, and methylmaleic acid. Examples of an acid anhydride of dicarboxylic acid may include maleic anhydride, acrylic anhydride, methylmaleic anhydride, and dimethylmaleic anhydride. Among these, mono-carboxylic acid is preferable, and acrylic acid and methacrylic acid are more preferable.

Examples of a monomer having a sulfonic acid group (a sulfonic acid monomer) may include vinylsulfonic acid, methylvinylsulfonic acid, (meth)allylsulfonic acid, styrenesulfonic acid, ethyl (meth)acrylic acid-2-sulfonate, 2-acrylamide-2-methylpropanesulfonic acid, 3-allyloxy-2-hydroxypropanesulfonic acid, and 2-(N-acryloyl)amino-2-methyl-1,3-propane-disulfonic acid. Among these, 2-acrylamide-2-methylpropanesulfonic acid is preferable.

Examples of a monomer having a phosphonic acid group (a phosphonic acid monomer) may include 2-(meth)acryloyloxyethyl phosphate, methyl-2-(meth)acryloyloxyethyl phosphate, and ethyl-(meth)acryloyloxyethyl phosphate.

Furthermore, salts of the aforementioned monomers may also be used as the acid group-containing monomer. Examples of such salts may include sodium salt of styrenesulfonic acid such as p-styrenesulfonic acid.

As the acid group-containing monomers and the acid group-containing monomer units, one type thereof may be solely used, and two or more types thereof may also be used in combination at any ratio.

Although an acid group may be introduced through polymerization of the aforementioned acid group-containing monomers, it may also be introduced by polymerizing the particulate binder that does not have an acid group and thereafter substituting a part or all of the functional groups in the particulate binder with an acid group. A repeating unit in the particulate binder having the acid group that has been introduced in this manner is also included in the acid group-containing monomer unit.

The ratio of the acid group-containing monomer unit in the particulate binder is preferably 0.1% by weight or more, more preferably 0.2% by weight or more, and particularly preferably 0.5% by weight or more, and is preferably 10% by weight or less, more preferably 5% by weight or less, and particularly preferably 3% by weight or less. When the ratio of the acid group-containing monomer unit in the particulate binder is equal to or more than the lower limit of the aforementioned range, binding property between the porous membrane and the separator substrate or the polar plate can be effectively improved. When the ratio of the acid group-containing monomer unit in the particulate binder is equal to or less than the upper limit, durability of the porous membrane can be improved.

The particulate binder may contain a carboxylic acid primary amide monomer unit. The carboxylic acid primary amide monomer unit is a structural unit having a structure that is formed by polymerization of a carboxylic acid primary amide monomer. The carboxylic acid primary amide monomer is a compound having a structure formed by condensing carboxylic acid and primary amide. When the particulate binder contains the carboxylic acid primary amide monomer unit at a predetermined ratio, in a secondary battery including the porous membrane formed with the composition for porous membranes according to the present invention, gas generation can be reduced, and thereby battery performances can be improved.

Examples of the carboxylic acid primary amide monomer may include an unsaturated carboxylic acid primary amide compound such as (meth)acrylamide, α-chloroacrylamide, crotonic acid amide, maleic acid diamide, and fumaric acid diamide. Among these, (meth)acrylamide is preferable. As the carboxylic acid primary amide monomers and the carboxylic acid amide monomer units, one type thereof may be solely used, and two or more types thereof may also be used in combination at any ratio.

The ratio of the carboxylic acid primary amide monomer unit in the particulate binder is usually 0.1% by weight or more, preferably 0.5% by weight or more, and more preferably 1.0% by weight or more, and is usually 10% by weight or less, preferably 7% by weight or less, and more preferably 5% by weight or less. When the ratio of the carboxylic acid primary amide monomer unit in the particulate binder is equal to or more than the lower limit of the aforementioned range, halide ions in an electrolytic solution can be effectively trapped by the particulate binder. When the ratio is equal to or less than the upper limit, rate property of the secondary battery can be enhanced.

The particulate binder may also contain a crosslinkable monomer unit. Here, the crosslinkable monomer unit is a structural unit having a structure that is obtained by polymerization of a crosslinkable monomer. The crosslinkable monomer is a monomer that can form a crosslinked structure by heating or irradiation with energy rays during or after polymerization. The inclusion of the crosslinkable monomer unit enables the particulate binder to be crosslinked, thereby improving the strength and stability of the porous membrane. This enables the effect of the particulate binder to be stably exerted. Furthermore, the inclusion of the crosslinkable monomer unit can limit the swelling degree of the particulate binder by an electrolytic solution in a range that is not excessively high, and thereby the secondary battery can usually have favorable output property.

Examples of the crosslinkable monomer may include a monomer having two or more reactive groups per molecule. More specific examples may include a monofunctional monomer having one olefinic double bond per molecule and a thermally crosslinkable group; and a polyfunctional monomer having two or more olefinic double bonds per molecule.

Examples of the thermally crosslinkable group contained in the monofunctional monomer may include an N-methylol amide group, an epoxy group, an oxetanyl group, an oxazoline group, and a combination thereof. Among these, an epoxy group is more preferable since crosslinking and crosslinking density can be easily adjusted.

Examples of the crosslinkable monomer having an N-methylol amide group as a thermally crosslinkable group and having an olefinic double bond may include (meth)acrylamide having a methylol group such as N-methylol (meth)acrylamide.

Examples of the crosslinkable monomer having an epoxy group as a thermally crosslinkable group and having an olefinic double bond may include unsaturated glycidyl ether such as vinyl glycidyl ether, allyl glycidyl ether, butenyl glycidyl ether, and o-allylphenyl glycidyl ether; monoepoxide of diene or polyene such as butadiene monoepoxide, chloroprene mono-epoxide, 4,5-epoxy-2-pentene, 3,4-epoxy-1-vinylcyclohexene, and 1,2-epoxy-5,9-cyclododecadiene; alkenyl epoxide such as 3,4-epoxy-1-butene, 1,2-epoxy-5-hexene, and 1,2-epoxy-9-decene; and a glycidyl ester compound of unsaturated carboxylic acid such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslinkable monomer having an oxetanyl group as a thermally crosslinkable group and having an olefinic double bond may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomer having an oxazoline group as a thermally crosslinkable group and having an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the polyfunctional monomer having two or more olefinic double bonds may include allyl (meth)acrylate, ethylene di(meth)acrylate, diethylene glycol di(meth)acrylate, triethylene glycol di(meth)acrylate, tetraethylene glycol di(meth)acrylate, trimethylol propane-tri(meth)acrylate, dipropylene glycol diallyl ether, polyglycol diallyl ether, triethylene glycol divinyl ether, hydroquinone diallyl ether, tetraallyl oxyethane, trimethylol propane-diallyl ether, allyl or vinyl ether of other polyfunctional alcohol, triallyl amine, and divinyl benzene.

Among these, as a crosslinkable monomer, N-methylolacrylamide, allyl methacrylate, ethylene dimethacrylate, allyl glycidyl ether, glycidyl methacrylate, and ethylene glycol dimethacrylate are preferable, and N-methylolacrylamide, allyl methacrylate, ethylene dimethacrylate, allyl glycidyl ether, and glycidyl methacrylate are more preferable.

As the crosslinkable monomers and the crosslinkable monomer units, one type thereof may be solely used, and two or more types thereof may also be used in combination at any ratio.

The ratio of the crosslinkable monomer unit in the particulate binder is preferably 0.1% by weight or more, more preferably 0.15% by weight or more, and particularly preferably 0.2% by weight or more, and is preferably 2.0% by weight or less, more preferably 1.5% by weight or less, and particularly preferably 1.0% by weight or less. When the ratio of the crosslinkable monomer unit in the particulate binder is equal to or more than the lower limit of the aforementioned range, mechanical strength of the particulate binder can be enhanced, thereby enhancing binding property between the porous membrane and the separator substrate or the polar plate. When the ratio of the crosslinkable monomer unit in the particulate binder is equal to or less than the upper limit, durability of the porous membrane can be improved.

The particulate binder may contain a (meth)acrylic acid ester monomer unit. The (meth)acrylic acid ester monomer unit is a structural unit having a structure that is formed by polymerization of a (meth)acrylic acid ester monomer. Since the (meth)acrylic acid ester monomer unit has high strength, the molecule of the particulate binder can be stabilized.

Examples of the (meth)acrylic acid ester monomer may include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. As the (meth)acrylic acid ester monomers and the (meth)acrylic acid ester monomer units, one type thereof may be solely used, and two or more types thereof may also be used in combination at any ratio.

The ratio of the (meth)acrylic acid ester monomer unit in the particulate binder is preferably 50% by weight or more, more preferably 55% by weight or more, and particularly preferably 58% by weight or more, and is preferably 98% by weight or less, more preferably 97% by weight or less, and particularly preferably 96% by weight or less. When the ratio of the (meth)acrylic acid ester monomer unit in the particulate binder is equal to or more than the lower limit of the aforementioned range, binding property between the porous membrane and the separator substrate or the polar plate can be enhanced. When the ratio of the (meth)acrylic acid ester monomer unit in the particulate binder is equal to or less than the upper limit, flexibility of the porous membrane can be improved.

Furthermore, the particulate binder may contain an optional structural unit other than the aforementioned structural units. Examples of the optional structural unit that may be contained in the particulate binder may include a structural unit having a structure that is formed by polymerization of the following monomers. That is, the examples may include structural units having a structure that is formed by polymerization of one or more of: aliphatic conjugated diene monomers such as 1,3-butadiene, 2-methyl-1,3-butadiene, 2,3-dimethyl-1,3-butadiene, and 2-chloro-1,3-butadiene; aromatic vinyl monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; α,β-unsaturated nitrile compound monomers such as acrylonitrile, methacrylonitrile, α-chloroacrylonitrile, and α-ethylacrylonitrile; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocyclic ring-containing vinyl compound monomers such as N-vinylpyrrolidone, vinylpyridine, and vinylimidazole. One type thereof may be solely used, and two or more types thereof may also be used in combination at any ratio.

As the particulate binders, one type thereof may be solely used, and two or more types thereof may also be used in combination at any ratio.

The weight average molecular weight of the polymer constituting the particulate binder is preferably 10,000 or more, and more preferably 20,000 or more, and is preferably 1,000,000 or less, and more preferably 500,000 or less. When the weight average molecular weight of the polymer constituting the particulate binder falls within the aforementioned range, strength of the porous membrane and dispersibility of the non-conductive particle are likely to be favorable. Here, the weight average molecular weight of the polymer constituting the particulate polymer may be obtained as a polystyrene equivalent value obtained by gel permeation chromatography (GPC) using tetrahydrofuran as a development solvent.

The glass transition temperature of the particulate binder is preferably −75° C. or higher, more preferably −55° C. or higher, and particularly preferably −35° C. or higher, and is preferably 40° C. or lower, more preferably 30° C. or lower, further more preferably 20° C. or lower, and particularly preferably 15° C. or lower. When the glass transition temperature of the particulate binder falls within the aforementioned range, a balance is highly and suitably achieved among properties such as flexibility and winding property of a separator including the porous membrane and an electrode as well as binding property between the porous membrane and the separator substrate or the polar plate. The glass transition temperature of the particulate binder may be adjusted by, for example, combining a variety of monomers. The glass transition temperature of the particulate binder is a value measured by differential scanning calorimetric analysis in accordance with JIS K7121.

The volume average particle size D50 of the particulate binder is preferably 0.01 μm or more, more preferably 0.05 μm or more, and further more preferably 0.1 μm or more, and is preferably 1.0 μm or less, more preferably 0.8 μm or less, and further more preferably 0.5 μm or less. When the volume average particle size of the particulate binder falls within the aforementioned range, the porous membrane can have favorable strength and flexibility.

The amount of the particulate binder in the composition for porous membranes according to the present invention relative to 100 parts by weight of the non-conductive particle is preferably 0.1 parts by weight or more, more preferably 0.5 parts by weight or more, and further more preferably 1 part by weight or more, and is preferably 15 parts by weight or less, more preferably 10 parts by weight or less, and further more preferably 8 parts by weight or less. When the amount of the particulate binder is equal to or more than the lower limit, adhesion property between the non-conductive particles and between the non-conductive particle and the substrate can be improved, so that occurrence of failures such as falling of particles from the porous membrane can be reduced. Furthermore, when the amount of the particulate binder is equal to or less than the upper limit, the Gurley values can be inhibited from increasing due to clogging of the pores of the substrate with the particulate binder.

The particulate binder may be manufactured by, for example, polymerizing a monomer composition containing the aforementioned monomers in an aqueous solvent.

The content ratio of each monomer in the monomer composition during the polymerization reaction is usually set to the same ratio as that of each repeating unit in the desired particulate binder.

As the aqueous solvent, an aqueous solvent in which the particulate binder can be dispersed in the state of particles may be selected. As the aqueous solvent, an aqueous solvent having a boiling point at normal pressure of preferably 80 to 350° C., and more preferably 100 to 300° C., may be selected.

Examples of the aqueous solvent may include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Among these, water is particularly preferable, because it is not combustible, and a dispersion of particles of the particulate binder can be easily obtained. The aforementioned aqueous solvents other than water may be used together with water used as a main solvent, as long as the dispersion state of particles of the particulate binder can be ensured.

Examples of the polymerization method may include, but not particularly limited to, a solution polymerization method, a suspension polymerization method, a bulk polymerization method, and an emulsion polymerization. The reaction form of polymerization may be any of ion polymerization, radical polymerization, and living radical polymerization. Among these, emulsion polymerization is particularly preferable from the viewpoint of manufacturing efficiency. For example, a high-molecular weight body is easily obtained. Furthermore, since a polymer product is obtained in a state of being dispersed in water as it is, re-dispersion treatment is not necessary, and the obtained polymer product can be used as it is for the manufacture of the composition for porous membranes according to the present invention. The emulsion polymerization may be performed in accordance with a method known per se in the art.

As additives such as emulsifiers, dispersants, polymerization initiators, and polymerization auxiliaries used in the polymerization, commonly used additives may be used. The amounts of these additives for use may also be commonly used amounts. The polymerization conditions may be appropriately adjusted depending on the types of the polymerization method and the polymerization initiator, and the like.

1.4. Water

The composition for porous membranes according to the present invention usually includes water. Water functions as a medium, that is, a solvent or a dispersion medium, in the composition for porous membranes. Usually, in the composition for porous membranes, the non-conductive particle and the particulate binder are dispersed in water, and a part or all of the water-soluble polymer (A) is dissolved in water.

As the medium, a combination of a medium other than water and water may also be used. Examples of the medium that may be used in combination with water may include cyclic aliphatic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether: alcohol compounds such as methanol, ethanol, isopropanol, ethylene glycol, and ethylene glycol monomethyl ether; and amide compounds such as N-methylpyrrolidone (NMP) and N,N-dimethylformamide. One type thereof may be solely used, and two or more types thereof may also be used in combination at any ratio. The amount of the medium other than water relative to 100 parts by weight of water is preferably 5 parts by weight or less.

The amount of the solvent in the composition for porous membranes is preferably set such that the solid content concentration of the composition for porous membranes is within a desired range. The specific solid content concentration of the composition for porous membranes is preferably 10% by weight or more, more preferably 15% by weight or more, and further more preferably 20% by weight or more, and is preferably 80% by weight or less, more preferably 75% by weight or less, further more preferably 70% by weight or less, and particularly preferably 65% by weight or less. Here, the solid content of a composition refers to a substance remaining after drying of the composition. When the solid content concentration is equal to or more than the aforementioned lower limit, removal of water can be easily performed during manufacture of the porous membrane, and the moisture content in the porous membrane can be reduced. When the solid content concentration is equal to or less than the aforementioned upper limit, favorable application can be performed.

1.5. Dispersant

The composition for porous membranes may include a dispersant. The inclusion of a dispersant enables components such as the non-conductive particle and the particulate binder to be stably dispersed in the composition for porous membranes. As the dispersant, known dispersants such as sodium dodecylbenzenesulfonate, sodium polyacrylate, and ammonium polyacrylate may be used.

The dispersant to be used may usually be those an aqueous solution of which has a low viscosity that is equal to or less than a specific value. Specifically, the viscosity of a 2% by weight aqueous solution of the dispersant is preferably less than 15 mPa·s, more preferably 10 mPa·s or less, and further more preferably 5 mPa·s or less. When such a low-viscosity dispersant is used, dispersibility can be improved. The viscosity of an aqueous solution of the dispersant is a value measured at 25° C. and at a revolution of 60 rpm using a B-type viscometer. The lower limit of the viscosity of a 2% by weight aqueous solution of the dispersant may be, but not particularly limited to, 0.1 mPa·s.

The amount of the dispersant in the composition for porous membranes in terms of the amount of the dispersant relative to 100 parts by weight of the non-conductive particle is preferably 0.05 parts by weight or more, more preferably 0.1 parts by weight or more, and further more preferably 0.2 parts by weight or more, and is preferably 5 parts by weight or less, more preferably 3 parts by weight or less, and further more preferably 2 parts by weight or less. When the amount of the dispersant is equal to or less than the aforementioned upper limit, the amount of a hydroxyl group in the porous membrane can be maintained within an adequate range, and the moisture content adsorbed to the porous membrane can be a low value. When the amount of the dispersant is equal to or more than the aforementioned lower limit, dispersion of the non-conductive particle can be favorable, and favorable application can be achieved.

1.6. Other Optional Components

The composition for porous membranes according to the present invention may include optional components other than the aforementioned components. As such optional components, a component that does not have excessively undesirable influence on battery reactions may be used. As the optional components, one type thereof may be solely used, and two or more types thereof may also be used in combination at any ratio. For example, the composition for porous membranes may include a binder other than the water-soluble polymer (A), as well as a leveling agent, an antioxidant, a defoaming agent, a wetting agent, and an electrolytic solution additive having a function of suppressing decomposition of an electrolytic solution.

1.7. Physical Properties of Composition for Porous Membranes

The composition for porous membranes according to the present invention may be prepared as a slurry having a viscosity suitable for application. The viscosity of the composition for porous membranes according to the present invention is preferably 5 mPa·s or more, more preferably 10 mPa·s or more, and further more preferably 15 mPa·s or more, and is preferably 200 mPa·s or less, more preferably 100 mPa·s or less, and further more preferably 40 mPa·s or less. When the viscosity of the composition for porous membranes is equal to or more than the aforementioned lower limit, the slurry of the composition for porous membranes can be prevented from dripping to cause unevenness in application during applying the slurry. When the viscosity of the composition for porous membranes is equal to or less than the aforementioned upper limit, the viscosity of the slurry of the composition for porous membranes can be maintained at an appropriately low value, and the layer of the composition for porous membranes is leveled after applying the composition for porous membranes. As a result, an undesired streak formed by application can be reduced. The viscosity of the composition for porous membranes is a value measured at a temperature of 25° C. and at a revolution of 60 rpm using a B-type viscometer. The viscosity of the composition for porous membranes may be adjusted by adjusting the molecular weight of the water-soluble polymer (A) and the contents of the water-soluble polymer (A) and other components.

The pH of the composition for porous membranes according to the present invention is preferably 6 or more, and more preferably 6.5 or more, and is preferably 10 or less, and more preferably 9.5 or less. When the pH of the composition for porous membranes is equal to or more than the aforementioned lower limit, stability of the non-conductive particle can be improved, and generation of the aggregate of the non-conductive particle can be inhibited, in the slurry of the composition for porous membranes. When the pH of the composition for porous membranes is equal to or less than the aforementioned upper limit, an already formed layer of the composition for porous membranes can be prevented from being dissolved when the composition for porous membranes is applied onto the already formed layer. Thus, peel strength and thermal shrinkage resistance of the obtained porous membrane can be improved. Furthermore, when an adhesive containing an aqueous medium is further applied onto a formed porous membrane, the formed porous membrane can be prevented from being immersed in the aqueous medium. Thus, peel strength of the porous membrane can be maintained. The pH of the composition for porous membranes can be adjusted by adjusting the contents of the water-soluble polymer (A) and other components, and as necessary, by adding an acid or a base for adjusting pH.

1.8. Manufacturing Method of Composition for Porous Membranes

The manufacturing method of the composition for porous membranes is not particularly limited, but usually includes mixing the aforementioned components. The mixing order is not particularly limited. The mixing method is also not particularly limited. Usually, mixing is performed using a disperser as a mixing apparatus in order to rapidly disperse the non-conductive particles.

Preferably, the disperser can disperse and mix the aforementioned components in a uniform manner. Examples of the disperser may include a ball mill, a sand mill, a pigment disperser, a kneader, an ultrasonic disperser, a homogenizer, and a planetary mixer. Among these, high-dispersion apparatuses such as a bead mill, a roll mill, and Filmix are particularly preferable, since they can add a high dispersion share.

2. Porous Membrane

The porous membrane for secondary batteries according to the present invention (hereinafter, sometimes simply referred to as the porous membrane according to the present invention) is obtained by forming a layer of the composition for porous membranes of secondary batteries according to the present invention and drying the formed layer.

The layer of the composition for porous membranes may be obtained by applying the composition for porous membranes onto a substrate. The substrate is a member that becomes an object to which a membrane of the composition for porous membranes is formed. The substrate is not limited. For example, a membrane of the composition for porous membranes may be formed on the surface of a release film, from which a solvent may be removed to form a porous membrane, and the porous membrane may be peeled from the release film. However, from the viewpoint of omitting the process of peeling the porous membrane for improving manufacturing efficiency, a component of a battery is usually used as the substrate. Examples of such a component of a battery may include a separator substrate and a polar plate.

Examples of the application method may include a doctor blade method, a dipping method, a reverse roll method, a direct roll method, a gravure method, an extrusion method, and a brushing method. Among these, dipping and gravure methods are preferable, because a uniform porous membrane can be obtained. The inclusion of the specific water-soluble polymer (A) in the composition for porous membranes according to the present invention enables application to be easily performed, to obtain a high-quality layer easily, and to reduce the content of moisture remaining in the porous membrane.

Examples of a specific method for drying the layer of the composition for porous membranes may include: drying with air such as warm air, hot air, and low moisture air; vacuum drying; and a drying process by irradiation with IR, far IR, electron beams, or the like.

The drying temperature is preferably 40° C. or higher, more preferably 45° C. or higher, and particularly preferably 50° C. or higher, and is preferably 90° C. or lower, and more preferably 80° C. or lower. When the drying temperature is equal to or higher than the lower limit of the aforementioned range, the solvent and the low molecular compound can be efficiently removed from the composition for porous membranes. Furthermore, when the drying temperature is equal to or lower than the upper limit, deformation of the substrate due to heat can be suppressed.

In the manufacturing method of the porous membrane according to the present invention, optional operations other than the aforementioned operations may be performed.

For example, pressurization treatment may be performed to the porous membrane by a press process such as mold press and roll press. Performing pressurization treatment can improve binding property between the substrate and the porous membrane. However, from the viewpoint of maintaining the porosity of the porous membrane within a preferable range, it is preferable that the pressure and the pressurization time are appropriately controlled not to excessively increase.

Furthermore, in order to remove residual moisture, the porous membrane is preferably dried by, for example, vacuum drying or in a dry room.

The thickness of the porous membrane according to the present invention is preferably 0.1 μm or more, more preferably 0.2 μm or more, and particularly preferably 0.3 μm or more, and is preferably 20 μm or less, more preferably 15 μm or less, and particularly preferably 10 μm or less. When the thickness of the porous membrane is equal to or more than the lower limit of the aforementioned range, heat resistance of the porous membrane can be improved. Furthermore, when the thickness of the porous membrane is equal to or less than the upper limit, reduction of ion conductivity caused by the porous membrane can be suppressed.

3. Separator for Secondary Batteries

When a separator substrate is used as a substrate, there may be obtained a separator for secondary batteries including the separator substrate and the porous membrane according to the present invention. The porous membrane according to the present invention may be disposed on either only one surface or both surfaces of the separator substrate.

When the separator including the porous membrane according to the present invention is used as a separator in a secondary battery, the residual moisture content in the porous membrane is low, the thermal shrinkage of the porous membrane is small, and the porous membrane can exert halogen trapping capabilities. Therefore, changes in volume of a cell during use of the secondary battery can be reduced, and high-temperature cycle property of the secondary battery can be improved.

Examples of the separator substrate to be used may include a porous substrate having fine pores. The use of such a separator substrate enables prevention of a short circuit without interfering with charge and discharge of the battery in the secondary battery. Specific examples of the separator substrate may include a microporous membrane or nonwoven fabric containing polyolefin resin such as polyethylene resin and polypropylene resin, aromatic polyamide resin, or the like.

The thickness of the separator substrate is preferably 0.5 μm or more, and more preferably 1 μm or more, and is preferably 40 μm or less, and more preferably 30 μm or less. When the thickness of the substrate is within this range, resistance due to the separator substrate in the secondary battery decreases, and workability during manufacture of the battery is excellent.

4. Electrode for Secondary Batteries

When a polar plate is used as a substrate, there can be obtained an electrode for secondary batteries including the polar plate and the porous membrane according to the present invention. As described herein, a "polar plate" refers to a member other than the porous membrane of the electrode including the porous membrane. A polar plate usually includes a current collector and an electrode active material layer. An electrode for secondary batteries including a polar plate and the porous membrane according to the present invention usually includes a current collector, an electrode active material layer, and the porous membrane according to the present invention, in this order. For example, when a polar plate includes an electrode active material layer disposed on only one surface of a current collector, it may have a layer structure of current collector/electrode active material layer/porous membrane. Furthermore, for example, when a polar plate includes an electrode active material layer disposed on both surfaces of a current collector, it may have a layer structure of porous membrane/electrode active material layer/current collector/electrode active material layer/porous membrane.

When the electrode including the porous membrane according to the present invention is used as an electrode in a secondary battery, the residual moisture content in the porous membrane is low, the thermal shrinkage of the porous membrane is small, and the porous membrane can exert halogen trapping capabilities. Therefore, change in volume of a cell during use of the secondary battery can be reduced, and high-temperature cycle property of the secondary battery can be improved.

4.1. Current Collector

As the current collector of a polar plate, a material having electric conductivity and electrochemical durability may be used. Usually, as a material of this current collector, a metal material is used. Examples of the metal material may include iron, copper, aluminum, nickel, stainless steel, titanium, tantalum, gold, and platinum. Among these, aluminum is preferable as a current collector used in a positive electrode, and copper is preferable as a current collector used in a negative electrode. As the aforementioned materials, one type thereof may be solely used, and two or more types thereof may also be used in combination at any ratio.

The shape of the current collector is not particularly limited, but is preferably a sheet having a thickness of approximately 0.001 mm to 0.5 mm.

4.2. Electrode Active Material Layer

The electrode active material layer is a layer disposed on a current collector, and contains an electrode active material. The type of the electrode active material varies depending on the type of the secondary battery. Here, an electrode active material for lithium ion secondary batteries will be particularly described. However, the electrode active material is not limited to the following materials.

As the electrode active material for lithium ion secondary batteries, a material that can reversibly intercalate or deintercalate lithium ions by applying an electropotential in an electrolytic solution may be used. The electrode active material to be used may be an inorganic compound, and may also be an organic compound.

A positive electrode active material is roughly classified into a material composed of an inorganic compound and a material composed of an organic compound. Examples of the positive electrode active material composed of an inorganic compound may include a transition metal oxide, a composite oxide of lithium and transition metal, and a transition metal sulfide. Examples of the aforementioned transition metal to be used may include Fe, Co, Ni, and Mn. Specific examples of the inorganic compound used in the positive electrode active material may include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. Examples of the positive electrode active material composed of an organic compound may include a conductive polymer such as polyacetylene and poly-p-phenylene.

Furthermore, a positive electrode active material composed of a composite material that is a combination of an inorganic compound and an organic compound may also be used.

Further, for example, an iron-based oxide may be subjected to reduction firing in the presence of a carbon source substance to prepare a composite material coated with a carbon material, so that this composite material is used as a positive electrode active material. An iron-based oxide tends to have poor electrical conductivity. However, when the iron-based oxide is modified to be the aforementioned composite material, it may be used as a high-performance positive electrode active material.

Furthermore, the aforementioned compound may be subjected to partial element substitution to be used as a positive electrode active material.

As these positive electrode active materials, one type thereof may be solely used, and two or more types thereof may also be used in combination at any ratio. A mixture of the aforementioned inorganic compound and organic compound may also be used as the positive electrode active material.

The particle size of the positive electrode active material may be selected in view of other structural requirements for secondary batteries. From the viewpoint of improvement of battery properties such as load property and cycle property, the volume average particle size of the positive electrode active material is preferably 0.1 µm or more, and more preferably 1 µm or more, and is preferably 50 µm or less, and more preferably 20 µm or less. When the volume average particle size of the positive electrode active material falls within this range, a battery having a large charge and discharge capacity can be obtained, and handling in manufacturing an electrode slurry composition and an electrode is easy.

The ratio of the positive electrode active material in the electrode active material layer is preferably 90% by weight or more, and more preferably 95% by weight or more, and is preferably 99.9% by weight or less, and more preferably 99% by weight or less. When the amount of the positive electrode active material falls within the aforementioned range, the secondary battery can have increased capacity. Furthermore, flexibility of the positive electrode and binding property between the current collector and the positive electrode active material layer can be improved.

Examples of the negative electrode active material may include carbonaceous materials such as amorphous carbon, graphite, naturally occurring graphite, artificial graphite, mesocarbon microbeads, and pitch-based carbon fiber; and conductive polymers such as polyacene. Further examples may include metal such as silicon, tin, zinc, manganese, iron, and nickel, and alloys thereof; oxides of the metal or alloys; and sulfates of the metal or alloys. Other examples may include metal lithium; lithium alloys such as Li—Al, Li—Bi—Cd, and Li—Sn—Cd; lithium transition metal nitride; and silicon. Furthermore, the electrode active material to be used may include a conductive material attached on the surface thereof by a mechanical modification method. As these negative electrode active materials, one type thereof may be solely used, and two or more types thereof may also be used in combination at any ratio.

The particle size of the negative electrode active material is appropriately selected in view of other structural requirements for secondary batteries. From the viewpoint of improvement of battery properties such as initial efficiency, load property, and cycle property, the volume average particle size of the negative electrode active material is preferably 0.1 µm or more, more preferably 1 µm or more, and further preferably 5 µm or more, and is preferably 100 µm or less, more preferably 50 or less, and further preferably 20 µm or less.

The specific surface area of the negative electrode active material is, from the viewpoint of improvement of power density, preferably 2 $m^2/g$ or more, more preferably 3 $m^2/g$ or more, and further preferably 5 $m^2/g$ or more, and is preferably 20 $m^2/g$ or less, more preferably 15 $m^2/g$ or less, and further preferably 10 $m^2/g$ or less. The specific surface area of the negative electrode active material may be measured by, for example, the BET method.

The ratio of the negative electrode active material in the electrode active material layer is preferably 85% by weight or more, and more preferably 88% by weight or more, and is preferably 99% by weight or less, and more preferably 97% by weight or less. When the amount of the negative electrode active material falls within the aforementioned range, the negative electrode can achieve excellent flexibility and binding property while exhibiting high capacity.

The electrode active material layer preferably contains a binder for electrodes other than the electrode active material. The inclusion of the binder for electrodes improves binding property of the electrode active material layer, and increases strength against mechanical force applied during processes such as winding of the electrode. Furthermore, the inclusion of the binder decreases tendency of the electrode active material layer to cause peeling from the current collector and the porous membrane, and thereby the risk of a short circuit due to the peeled material is reduced.

As the binder for electrodes, a polymer, for example, may be used. Examples of the polymer that may be used as the binder for electrodes may include polyethylene, polytetrafluoroethylene (PTFE), polyvinylidene fluoride (PVDF), a tetrafluoroethylene-hexafluoropropylene copolymer (FEP), a polyacrylic acid derivative, and a polyacrylonitrile derivative.

Furthermore, particles of the soft polymers exemplified below may be used as a particulate binder. Examples of the soft polymer may include:

(i) an acrylic-based soft polymer that is a homopolymer of an acrylic acid or methacrylic acid derivative or a copolymer of the acrylic acid or methacrylic acid derivative with a monomer copolymerizable therewith, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer, and a butyl acrylate-acrylonitrile-glycidyl methacrylate copolymer;

(ii) an isobutylene-based soft polymer such as polyisobutylene, isobutylene-isoprene rubber, and an isobutylene-styrene copolymer;

(iii) a diene-based soft polymer such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer, and a styrene-isoprene-styrene block copolymer;

(iv) a silicon-containing soft polymer such as dimethylpolysiloxane, diphenylpolysiloxane, and dihydroxypolysiloxane;

(v) an olefin-based soft polymer such as liquid polyethylene, polypropylene, poly-1-butene, an ethylene-α-olefin copolymer, a propylene-α-olefin copolymer, an ethylene-propylene-diene copolymer (EPDM), and an ethylene-propylene-styrene copolymer;

(vi) a vinyl-based soft polymer such as polyvinyl alcohol, polyvinyl acetate, polyvinyl stearate, and a vinyl acetate-styrene copolymer;

(vii) an epoxy-based soft polymer such as polyethylene oxide, polypropylene oxide, and epichlorhydrin rubber;

(viii) a fluorine-containing soft polymer such as vinylidene fluoride-based rubber, and tetrafluoroethylene-propylene rubber; and (ix) other soft polymers such as natural rubber, polypeptide, protein, polyester-based thermoplastic elastomer, vinyl chloride-based thermoplastic elastomer, and polyamide-based thermoplastic elastomer.

These soft polymers may have a crosslinked structure, and may be modified to have a functional group introduced thereinto.

The aforementioned polymers may be particulate, and may also be non-particulate.

As the binders for electrodes, one type thereof may be solely used, and two or more types thereof may also be used in combination at any ratio.

The amount of the binder for electrodes in the electrode active material layer relative to 100 parts by weight of the electrode active material is preferably 0.1 parts by weight or more, more preferably 0.2 parts by weight or more, and particularly preferably 0.5 parts by weight or more, and is preferably 5 parts by weight or less, and more preferably 3 parts by weight or less. When the amount of the binder for electrodes falls within the aforementioned range, the electrode active material can be prevented from detaching from the electrode without disturbing a battery reaction.

The electrode active material layer may include optional components other than the electrode active material and the binder for electrodes, as long as the effects of the present invention are not significantly impaired. Examples thereof may include a conductive material and a reinforcing material. As the optional components, one type thereof may be solely used, and two or more types thereof may also be used in combination at any ratio.

Examples of the conductive material may include conductive carbon such as acetylene black, Ketjen black, carbon black, graphite, vapor grown carbon fiber, and carbon nanotube; carbon powder such as graphite; and fiber and foil of a variety of metals. The use of the conductive material enables electrical contact between the electrode active materials to be improved and battery properties such as cycle property to be improved.

The specific surface area of the conductive material is preferably 50 $m^2/g$ or more, more preferably 60 $m^2/g$ or more, and particularly preferably 70 $m^2/g$ or more, and is preferably 1500 $m^2/g$ or less, more preferably 1200 $m^2/g$ or less, and particularly preferably 1000 $m^2/g$ or less. When the specific surface area of the conductive material is equal to or more than the lower limit of the aforementioned range, the secondary battery can have improved low-temperature output property. When the specific surface area of the conductive material is equal to or less than the upper limit, binding property between the electrode active material layer and the current collector can be enhanced.

Examples of the reinforcing material to be used may include a variety of inorganic and organic fillers that are spherical, plate-like, rod-like or fibrous. The use of the reinforcing material enables the electrode to have toughness and flexibility, and excellent long-term cycle property to be obtained.

The use amount of each of the conductive material and the reinforcing material relative to 100 parts by weight of the electrode active material is usually 0 parts by weight or more, and preferably 1 part by weight or more, and is preferably 20 parts by weight or less, and more preferably 10 parts by weight or less.

The thickness of the electrode active material layer, for both positive and negative electrodes, is preferably 5 µm or more, and more preferably 10 µm or more, and is preferably 300 µm or less, and more preferably 250 µm or less.

The manufacturing method of the electrode active material layer is not particularly limited. The electrode active material layer may be manufactured by, for example, applying an electrode slurry composition onto the current collector and then drying the obtained coat, where the electrode slurry composition contains the electrode active material and the solvent, and further the binder for electrodes and optional components if necessary. As the solvent, any of water and the organic solvent may be used.

5. Secondary Battery

The secondary battery according to the present invention includes the porous membrane according to the present invention. The secondary battery usually includes a positive electrode, a negative electrode, and an electrolytic solution, and satisfies one or both of the following requirements (A) and (B).

(A) At least one of the positive and negative electrodes of the secondary battery according to the present invention is an electrode including a polar plate and the porous membrane according to the present invention.

(B) The secondary battery according to the present invention includes a separator, and the separator is a separator including a separator substrate and the porous membrane according to the present invention.

The porous membrane according to the present invention has a low residual moisture content and small thermal shrinkage, and can exert halogen trapping capabilities. Therefore, when the electrode and/or the separator including the porous membrane according to the present invention are used as components of the secondary battery, change in volume of a cell during use of such a secondary battery can be reduced, and high-temperature cycle property of the secondary battery can be improved.

5.1. Separator

The secondary battery according to the present invention includes in principle the separator including the porous membrane according to the present invention as a separator. However, when the secondary battery according to the present invention includes at least one of the positive and negative electrodes containing the porous membrane according to the present invention, the secondary battery may include a separator other than the separator including the porous membrane according to the present invention as a separator. Since the porous membrane in the electrode including the porous membrane according to the present invention has a function as a separator, a separator may be omitted when the electrode includes the porous membrane according to the present invention.

5.2. Electrode

The secondary battery according to the present invention includes in principle the electrode including the porous membrane according to the present invention, as one or both of the positive and negative electrodes. However, when the secondary battery according to the present invention includes as a separator the separator including the porous membrane according to the present invention, the secondary battery may include an electrode that does not include the porous membrane according to the present invention as both of the positive and negative electrodes.

5.3. Electrolytic Solution

Examples of the electrolytic solution to be used may include an electrolytic solution obtained by dissolving a lithium salt as a support electrolyte in a non-aqueous solvent. Examples of a lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which are easily dissolved in a solvent and exhibit high dissociation degree, are suitably used. One type thereof may be solely used, and two or more types thereof may also be used in combination at any ratio.

The amount of the support electrolyte in terms of the concentration in the electrolytic solution is preferably 1% by weight or more, and more preferably 5% by weight or more, and is preferably 30% by weight or less, and more preferably 20% by weight or less. When the amount of the support electrolyte falls within this range, high ion conductivity is obtained, and the secondary battery can have favorable charge and discharge property.

As the solvent used in the electrolytic solution, there may be used a solvent in which the support electrolyte can be dissolved. Examples of such a solvent may include alkyl carbonate compounds such as dimethyl carbonate (DMC), ethylene carbonate (EC), diethyl carbonate (DEC), propylene carbonate (PC), butylene carbonate (BC), and ethyl methyl carbonate (EMC); ester compounds such as γ-butyrolactone and methyl formate; ether compounds such as 1,2-dimethoxyethane and tetrahydrofuran; and sulfur-containing compounds such as sulfolane and dimethyl sulfoxide. In particular, dimethyl carbonate, ethylene carbonate, propylene carbonate, diethyl carbonate, and methyl ethyl carbonate are preferable, because high ion conductivity is easily obtained, and the usable temperature range is wide. As the solvents, one type thereof may be solely used, and two or more types thereof may also be used in combination at any ratio.

The electrolytic solution may contain an additive as necessary. Preferable examples of the additive may include carbonate-based compounds such as vinylene carbonate (VC). As the additives, one type thereof may be solely used, and two or more types thereof may also be used in combination at any ratio.

5.4. Manufacturing Method of Secondary Battery

The manufacturing method of the secondary battery according to the present invention is not particularly limited. For example, the aforementioned negative electrode and positive electrode may be stacked via a separator, and the resulting stack may be, for example, wound or folded in conformity with the battery shape, and placed in a battery container. Then, an electrolytic solution may be injected in the battery container, and the battery container may be sealed. Furthermore, expanded metal; an overcurrent prevention element such as a fuse and a PTC element; a lead plate; and the like may be placed as necessary, thereby preventing the increase in pressure inside a battery and the excessive charge and discharge. Examples of the battery shape may include laminate cell-type, coin-type, button-type, sheet-type, cylinder-type, rectangle-type, and flat-type.

EXAMPLES

Hereinafter, the present invention will be specifically described by illustrating Examples. However, the present invention is not limited to the following Examples, which can be optionally modified within the scope not departing from the claims of the present invention and their equivalents for implementation. Unless otherwise stated, "%" and "parts" indicating quantity in the following description are based on weight.

In Examples and Comparative Examples, measurement of the molecular weight, storage modulus, and glass transition temperature of the water-soluble polymer (A); measurement of the pH and viscosity of the composition for porous membranes; measurement of the particle size of the non-conductive particle; evaluation of the application property, moisture content, and thermal shrinkage resistance of the separator; and evaluation of the high-temperature cycle property in the secondary battery, the volume change amount of the cell, and the halogen trapping amount were performed as described below.

Molecular Weight Measurement Method

An aqueous solution of the water-soluble polymer (A) obtained in each of Examples and Comparative Examples was diluted to a concentration of 0.5% by weight, and thereafter added with caustic soda until pH 10 to 12 was achieved. Then, the resultant product was immersed in hot water bath at 80° C. or higher for one hour. After that, it was diluted with an eluent (described below) to 0.025% by weight. Thus, a sample was prepared. This sample was analyzed by gel permeation chromatography under the following conditions to obtain the weight average molecular weight of the water-soluble polymer (A).

GPC device body: manufactured by Tosoh Corporation
Column: one PWXL and two GMPWXLs that are Guard Column manufactured by Tosoh Corporation (temperature: 40° C.)
Eluent: 0.5 mol/l acetic acid buffer (aqueous solution of 0.5 mol/l acetic acid (manufactured by Wako Pure Chemical Industries, Ltd.)+0.5 mol/l sodium acetate (manufactured Kishida Chemical Co., Ltd.), pH: approximately 4.2)
Flow rate: 0.8 ml/min
Detector: TDA MODEL 301 manufactured by Viscotech Co., Ltd. (concentration detector and 90° light scattering detector and viscosity detector (temperature: 40° C.)), RALLS method pH Measurement Method A desktop pH meter (F-51 manufactured by HORIBA) was calibrated with a pH standard solution (pH 4, pH 7, and pH 9). Then, this calibrated pH meter was used to measure the pH of the slurry of the composition for porous membranes.

Storage Modulus and Glass Transition Temperature

An aqueous solution of the water-soluble polymer (A) obtained in each of Examples and Comparative Examples was dried at room temperature to obtain a film with a thickness of 0.5 mm. The film was punched into a circular shape with a diameter of 8 mm to be used as a sample piece. Using the following apparatus, the sample piece was distorted with a frequency of 1 Hz, and measured for dynamic viscoelasticity while increasing the temperature at the following temperature increasing rate. On the basis of this measurement result, the storage modulus and glass transition temperature were obtained.

Apparatus: product name "MCR300" manufactured by Anton Paar
Set temperature range: 25° C. to 200° C.
Set temperature increasing rate: 10° C./min
Measurement frequency: 1 Hz Viscosity The viscosity of the slurry of the composition for porous membranes was measured at 25° C. and at a revolution of 60 rpm using a B-type viscometer.

Evaluation of Application Property

The state of the porous membrane of the separator (the separator substrate and the porous membrane formed on one surface of the separator substrate) obtained in each of Examples and Comparative Examples was observed from the porous membrane side while light irradiation was performed from the separator substrate side surface. Thus, presence or absence of a streak and application unevenness was evaluated.

Measurement Method of Particle Sizes of Non-conductive Particle and Particulate Binder The non-conductive particle or the particulate binder was ultrasonically dispersed with an aqueous solution of sodium hexametaphosphate, and then analyzed by a laser diffraction particle size distribution analyzer ("SALD-7100" manufactured by Shimadzu Corporation). Thus, particle size D50 was obtained.

Measurement of Moisture Content

The separator obtained in each of Examples and Comparative Examples was cut out into a size of 10 cm in width×10 cm in length as a test piece. This test piece was left to stand at a temperature of 25° C. and a dew-point temperature of −60° C. for 24 hours. After that, the moisture content of the test piece was measured using a coulometric titration-type moisture meter by the Karl Fischer method (JIS K-0068(2001) moisture vaporization method, vaporization temperature: 150° C.). This was adopted as the moisture content of the porous membrane, and evaluated in accordance with the following criteria.

A: Moisture content of porous membrane is less than 200 ppm.
B: Moisture content of porous membrane is equal to or more than 200 ppm and less than 300 ppm.

C: Moisture content of porous membrane is equal to or more than 300 ppm and less than 400 ppm.

D: Moisture content of porous membrane is equal to or more than 400 ppm.

Thermal Shrinkage Resistance

The separator obtained in each of Examples and Comparative Examples was cut into a square of 12 cm in width×12 cm in length, and a square having edges each having a length of 10 cm was drawn inside the cut square to obtain a test piece. The test piece was placed in a constant temperature bath at 130° C., and left to stand for one hour for heat treatment. After the heat treatment, the area of the square drawn inside the test piece was measured, and a change in area before and after the heat treatment was obtained as thermal shrinkage ratio. Then, the obtained thermal shrinkage ratio was evaluated in accordance with the following criteria. Smaller thermal shrinkage indicates that the separator has better thermal shrinkage resistance.

A: Thermal shrinkage is less than 1%.

B: Thermal shrinkage is equal to or more than 1% and less than 5%.

C: Thermal shrinkage is equal to or more than 5% and less than 10%.

D: Thermal shrinkage is equal to or more than 10%.

High-Temperature Cycle Property

A charge and discharge process of charging up to 4.2 V and discharging down to 3V by a constant current method at 0.2 C under the atmosphere at 60° C. was repeated 50 times (=50 cycles) on 10 batteries obtained in each of Examples and Comparative Examples, and the electric capacity was measured. The average value of the measurement results for 10 batteries was adopted as a measured value. The ratio of the electric capacity after completion of 200 cycles relative to the electric capacity after completion of 5 cycles was calculated in percentage to obtain a charge and discharge capacity retention rate. This was adopted as the evaluation base for high-temperature cycle property, and evaluated in accordance with the following criteria. A higher value indicates that high-temperature cycle property is better.

A: Charge and discharge capacity retention rate is equal to or more than 80%.

B: Charge and discharge capacity retention rate is equal to or more than 70% and less than 80%.

C: Charge and discharge capacity retention rate is equal to or more than 60% and less than 70%.

D: Charge and discharge capacity retention rate is less than 60%.

Measurement Method of Change in Volume of Cell

The battery obtained in each of Examples and Comparative Examples was left to stand in the environment at 25° C. for 24 hours. After that, a charge and discharge operation of charging up to 4.35 V at 0.1 C and discharging down to 2.75 V at 0.1 C under the environment at 25° C. was performed. After that, the battery was immersed in liquid paraffin, and measured for its volume V0.

Furthermore, a cycle of charging up to 4.35 V at 0.1 C and discharging down to 2.75 V at 0.1 C under the environment at 60° C. was repeated 1000 times. After that, the battery was immersed in liquid paraffin, and measured for its volume V1.

The volume change amount $\Delta V$ of a battery cell before and after the 1000 cycles of charging and discharging was calculated by the formula "$\Delta V=(V1-V0)/V0\times100(\%)$", and evaluated in accordance with the following criteria. A smaller value of this volume change amount $\Delta V$ indicates that an ability of suppressing gas generation is better.

A: Value of $\Delta V$ is less than 22%.

B: Value of $\Delta V$ is equal to or more than 22% and less than 24%.

C: Value of $\Delta V$ is equal to or more than 24% and less than 26%.

D: Value of $\Delta V$ is equal to or more than 26%.

Halogen Trapping Amount

After the high-temperature cycle test, the electrolytic solution was taken out of the battery, and the electrolytic solution was measured for its fluorine ion concentration and chloride ion concentration by an inductively coupled plasma atomic emission spectroscopic analyzer (ICP-AES). The total amount of these ion concentrations was adopted as the halogen concentration, and evaluated in accordance with the following criteria. It is considered that the smaller the halogen concentration in the electrolytic solution is, the higher the ability of trapping halogen inside the battery is, thereby contributing to longer battery life and reduced gas generation.

A: Halogen concentration in electrolytic solution is less than 100 ppm.

B: Halogen concentration in electrolytic solution is equal to or more than 100 ppm or less than 120 ppm.

C: Halogen concentration in electrolytic solution is equal to or more than 120 ppm or less than 140 ppm.

D: Halogen concentration in electrolytic solution is equal to or more than 140 ppm.

Example 1

1-1. Manufacture of Water-Soluble Polymer (A)

In a four-necked flask equipped with a stirrer, a thermometer, a reflux condenser, and a nitrogen gas introduction pipe, a monomer composition consisting of 89.5 parts of acrylamide, 9 parts of methacrylic acid, and 1.5 parts of dimethylacrylamide, as well as 365 parts of ion exchanged water and 5 parts of isopropyl alcohol were charged. Then, oxygen in the reaction system was removed with nitrogen gas. Next, under stirring, 7 parts of a 5% aqueous solution of ammonium persulfate and 3 parts of a 5% aqueous solution of sodium bisulfite were poured as a polymerization initiator in the flask. After that, the obtained mixture was increased in temperature from room temperature to 80° C., and thermally maintained for three hours. Then, 162 parts of ion exchanged water was added, and the pH was adjusted to 5 with 48% caustic soda. Thus, there was obtained an aqueous solution of the water-soluble polymer (A) having a solid content of 15.2%, a viscosity (25° C.) of 3050 mPa·s, and a weight average molecular weight of 361100.

The obtained water-soluble polymer (A) was measured for its weight average molecular weight. Furthermore, the dynamic viscoelasticity was measured, and the storage modulus and glass transition temperature were obtained.

1-2. Manufacture of Particulate Binder

Into a reaction container equipped with a stirrer, 70 parts of ion exchanged water, 0.15 parts of sodium lauryl sulfate (manufactured by Kao Chemical, product name: Aimard (registered trademark) 2F) as an emulsifier, and 0.5 parts of ammonium peroxodisulfate as a polymerization initiator were supplied. Then, the gas phase part was substituted with nitrogen gas, and the temperature was increased to 60° C.

On the other hand, in another container, 50 parts of ion exchanged water, and 0.5 parts of sodium dodecylbenzenesulfonate as an dispersant, as well as, as a monomer composition, 94.8 parts of n-butyl acrylate, 1 part of methacrylic acid, 1.2 parts of N-methylolacrylamide, 2 parts of acrylonitrile, and 1 part of allyl glycidyl ether were mixed. Thus, a monomer mixture was obtained. This monomer mixture was continuously added in the reaction container for four hours for performing polymerization. While the monomer mixture was added, the reaction was performed at 60° C. After the addition of the monomer mixture was completed, stirring was further continued at 70° C. for three hours to terminate the reaction. Thus, an aqueous dispersion liquid containing the particulate binder was manufactured.

The obtained particulate binder had a volume average particle size D50 of 0.37 µm and a glass transition temperature of −45° C.

1-3. Manufacture of Slurry of Composition for Porous Membranes 100 parts of barium sulfate (volume average particle size: 0.5 µm, specific surface area: 5.5 g/m$^2$), 0.5 parts of ammonium polycarboxylate (dispersant, manufactured by Toagosei Co., Ltd., trade name "Aron A-6114"), and water were mixed. The amount of water was adjusted such that the solid content concentration became 50%. The mixture was treated using a media-less disperser to disperse barium sulfate. To the obtained dispersion liquid, 1.5 parts (in terms of the solid content) of the aqueous solution of the water-soluble polymer (A) having a solid content of 15.2% obtained in step (1-1) was added and mixed. The added water-soluble polymer (A) dissolved in the mixture. Next, 5 parts (in terms of the solid content) of the particulate binder obtained in step (1-2), and 0.2 parts of a wetting agent (manufactured by San Nopco Limited, trade name "SN WET 366") were added. Furthermore, water was mixed such that the solid content concentration became 40%. Thus, a slurry of the composition for porous membranes was manufactured.

The obtained slurry of the composition for porous membranes was measured for its pH and viscosity.

1-4. Manufacture of Separator

A single-layer polyethylene separator substrate having a width of 250 mm, a length of 1000 m, and a thickness of 12 µm manufactured by a wet method was prepared. The slurry for a porous membrane obtained in step (1-3) was applied onto one surface of the separator substrate using a gravure coater at a speed of 20 m/min such that the thickness of the dried coat became 2.5 Next, the separator substrate with the coat was dried in a drying furnace at 50° C., and then wound. Thus, a separator including the separator substrate and the porous membrane formed on one surface of the separator substrate was prepared.

The obtained separator was evaluated for its application property, moisture content, and thermal shrinkage resistance.

1-5. Manufacture of Positive Electrode 100 parts of LiCoO$_2$ (volume average particle size D50: 12 µm) as a positive electrode active material, 2 parts of acetylene black (manufactured by Denki Kagaku Kogyo Kabushiki Kaisha, HS-100) as a conductive material, 2 parts in terms of the solid content of PVDF (polyvinylidene fluoride, manufactured by Kureha Corporation, #7208) as a binder for positive electrode active material layers, and NMP (N-methylpyrrolidone) were mixed, such that the total solid content concentration became 70%. These were mixed in a planetary mixer to obtain a slurry composition for positive electrodes.

The obtained slurry composition for positive electrodes was applied onto aluminum foil having a thickness of 20 µm as a current collector using a comma coater such that the film thickness of the dried coat became approximately 150 µm, and then dried. This drying was performed by conveying the aluminum foil in an oven at 60° C. for two minutes at a speed of 0.5 m/min. After that, the positive electrode raw material was rolled with a roll press. Thus, a positive electrode including a positive electrode active material layer with a thickness of 95 µm was obtained.

1-6. Manufacture of Negative Electrode

In a 5 MPa pressure resistant container equipped with a stirrer, 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of ion exchanged water, and 0.5 parts of potassium peroxodisulfate as a polymerization initiator were placed. The mixture was sufficiently stirred, and then warmed to 50° C. for initiating polymerization. When the polymerization conversion ratio reached 96%, the mixture was cooled to terminate the reaction. Thus, a mixture containing a binder for negative electrode active material layers (SBR) was obtained. A 5% aqueous sodium hydroxide solution was added to the mixture containing the binder for negative electrode active material layers to adjust to pH 8. After that, unreacted monomers were removed through distillation by heating under reduced pressure. After that, the obtained product was cooled to 30° C. or lower. Thus, an aqueous dispersion liquid containing a desired binder for negative electrode active material layers was obtained.

A mixture of 100 parts of artificial graphite (volume average particle size D50: 15.6 µm) and 1 part in terms of the solid content of a 2% aqueous solution of sodium salt of carboxymethyl cellulose (manufactured by Nippon Paper Industries Co., Ltd., MAC350HC) as a thickener was prepared to a solid content concentration of 68% with ion exchanged water, and mixed at 25° C. for 60 minutes. The mixture was further adjusted to a solid content concentration of 62% with ion exchanged water, and mixed at 25° C. for 15 minutes. The aforementioned binder for negative electrode active material layers (SBR) in an amount of 1.5 parts in terms of the solid content and ion exchanged water were poured into the mixture, and the final solid content concentration was adjusted to 52%. Then, the obtained product was further mixed for 10 minutes. This mixture was subjected to defoaming treatment under reduced pressure. Thus, a slurry composition for negative electrodes having favorable fluidity was prepared.

The obtained slurry composition for negative electrodes was applied onto copper foil having a thickness of 20 µm as a current collector using a comma coater such that the film thickness of the dried coat became approximately 150 µm, and then dried. This drying was performed by conveying the copper foil in an oven at 60° C. for two minutes at a speed of 0.5 m/min. After that, the negative electrode raw material was rolled with a roll press. Thus, a negative electrode including a negative electrode active material layer with a thickness of 100 was obtained.

1-7. Manufacture of Lithium Ion Secondary Battery

As an exterior of a battery, an aluminum exterior package was prepared. The positive electrode obtained in step (1-5) was cut out into a square of 4.6 cm×4.6 cm to obtain a rectangular positive electrode. The separator obtained in step (1-4) was cut out into a square of 5.2 cm×5.2 cm to obtain a rectangular separator. Furthermore, the negative electrode obtained in step (1-6) was cut out into a square of 5 cm×5 cm to obtain a rectangular negative electrode. The rectangular positive electrode was disposed in the aluminum exterior package such that its surface on the current collector side came in contact with the exterior package. The rectangular separator was disposed on the surface on the positive electrode active material layer side of the rectangular positive electrode such that the surface on the porous membrane side came in contact with the rectangular positive electrode. Furthermore, the rectangular negative electrode was disposed on the separator such that the surface on the negative electrode active material layer side faced the separator. An electrolytic solution (solvent: EC/DEC/VC=68.5/30/1.5 in volume ratio, electrolyte: $LiPF_6$ having a concentration of 1 M) was injected such that air was not left. Furthermore, for sealing the opening of the aluminum package, heat sealing at 150° C. was performed to close the opening of the aluminum exterior package. Thus, a lithium ion secondary battery was manufactured.

This lithium ion secondary battery was evaluated for high-temperature cycle property, a volume change of a cell, and a halogen trapping amount.

Example 2

A lithium ion secondary battery was manufactured in the same manner as in Example 1, except that, in the manufacture of the water-soluble polymer (A) in step (1-1), the monomer composition was changed to include 97 parts of acrylamide, 2 parts of methallylsulfonic acid soda, and 1.0 part of dimethylacrylamide. Then, the manufactured lithium ion secondary battery and its components were measured and evaluated in the same manner as in Example 1.

Example 3

A lithium ion secondary battery was manufactured in the same manner as in Example 1, except that, in the manufacture of the water-soluble polymer (A) in step (1-1), the monomer composition was changed to include 83 parts of acrylamide, 9 parts of methallylsulfonic acid soda, 1.0 part of dimethylacrylamide, and 7 parts of dimethylaminoethyl acrylate. Then, the manufactured lithium ion secondary battery and its components were measured and evaluated in the same manner as in Example 1.

Example 4

A lithium ion secondary battery was manufactured in the same manner as in Example 1, except that, in the manufacture of the water-soluble polymer (A) in step (1-1), the monomer composition was changed to include 85 parts of acrylamide, 10 parts of methacrylic acid, and 5 parts of dimethylaminoethyl acrylate. Then, the manufactured lithium ion secondary battery and its components were measured and evaluated in the same manner as in Example 1.

Example 5

A lithium ion secondary battery was manufactured in the same manner as in Example 1, except that, in the manufacture of the water-soluble polymer (A) in step (1-1), the monomer composition was changed to include 88.5 parts of acrylamide and 2.5 parts of dimethylacrylamide. Then, the manufactured lithium ion secondary battery and its components were measured and evaluated in the same manner as in Example 1.

Example 6

A lithium ion secondary battery was manufactured in the same manner as in Example 1, except that, in the manufacture of the water-soluble polymer (A) in step (1-1), the monomer composition was changed to include 90.5 parts of acrylamide and 0.5 parts of dimethylacrylamide. Then, the manufactured lithium ion secondary battery and its components were measured and evaluated in the same manner as in Example 1.

Example 7

A lithium ion secondary battery was manufactured in the same manner as in Example 1, except that, in the manufacture of the water-soluble polymer (A) in step (1-1), the monomer composition was changed to include 89.0 parts of acrylamide, 9 parts of methacrylic acid, and 2.0 parts of dimethylacrylamide. Then, the manufactured lithium ion secondary battery and its components were measured and evaluated in the same manner as in Example 1.

Example 8

A lithium ion secondary battery was manufactured in the same manner as in Example 1, except that, in the manufacture of the slurry of the composition for porous membranes in step (1-3), alumina (specific surface area: 5.0 $g/m^2$, volume average particle size: 0.55 μm) was used in place of barium sulfate. Then, the manufactured lithium ion secondary battery and its components were measured and evaluated in the same manner as in Example 1.

Comparative Example 1

A lithium ion secondary battery was manufactured in the same manner as in Example 1, except that, in the manufacture of the water-soluble polymer (A) in step (1-1), the monomer composition was changed to include 75 parts of acrylamide, 9.8 parts of methacrylic acid, 0.2 parts of dimethylacrylamide, and 15 parts of dimethylaminoethyl acrylate. Then, the manufactured lithium ion secondary battery and its components were measured and evaluated in the same manner as in Example 1.

Comparative Example 2

A lithium ion secondary battery was manufactured in the same manner as in steps (1-2) to (1-7) of Example 1, except that, in the manufacture of the slurry of the composition for porous membranes in step (1-3), sodium carboxymethyl cellulose salt (product name "Daicel D1220", manufactured by Daicel FineChem Ltd., etherification degree: 0.8 to 1.0) was used in place of an aqueous solution of the water-soluble polymer (A) obtained in step (1-1). Then, the manufactured lithium ion secondary battery and its components were measured and evaluated in the same manner as in Example 1.

The evaluation results of the Examples and Comparative Examples are shown in Table 1 to Table 2.

TABLE 1

|  | Example 1 | Example 2 | Example 3 | Example 4 | Example 5 | Example 6 |
|---|---|---|---|---|---|---|
| Non-conductive particle type | Barium sulfate | Barium sulfate | Barium sulfate | Barium sulfate | Barium sulfate | Barium sulfate |
| Specific surface area | 5.5 | 5.5 | 5.5 | 5.5 | 5.5 | 5.5 |
| Particle size | 0.5 μm | 0.5 μm | 0.5 μm | 0.5 μm | 0.5 μm | 0.5 μm |
| Acrylamide amount | 89.5 wt % | 97 wt % | 83 wt % | 85 wt % | 88.5 wt % | 90.5 wt % |
| Acid group unit type | MAA | SAS(D) | SAS(D) | MAA | MAA | MAA |
| Acid group unit amount | 9 wt % | 2 wt % | 9 wt % | 10 wt % | 9 wt % | 9 wt % |
| DMAA amount | 1.5 wt % | 1.0 wt % | 1.0 wt % | 0 wt % | 2.5 wt % | 0.5 wt % |
| DMAEA amount | — | — | 7 wt % | 5 wt % | — | — |
| Storage modulus | $6.6 \times 10^5$ | $3.3 \times 10^5$ | $5.6 \times 10^5$ | $2.5 \times 10^5$ | $6.3 \times 10^5$ | $5.5 \times 10^5$ |
| Tg | 168 | 162 | 156 | 160 | 168 | 168 |
| Molecular weight | 361100 | 250000 | 387500 | 312000 | 9805000 | 200000 |
| Viscosity | 25 | 23 | 30 | 24 | 70 | 10 |
| Application property | Favorable | Favorable | Favorable | Favorable | A few streaks | A few streaks |
| Moisture content in porous membrane | A | A | A | A | A | A |
| Thermal shrinkage resistance | A | B | B | B | B | B |
| High-temperature cycle | A | A | A | A | B | B |
| Cell volume | A | A | A | A | B | B |
| Halogen trapping amount | A | A | A | A | A | A |

TABLE 2

|  | Example 7 | Example 8 | Comparative Example 1 | Comparative Example 2 |
|---|---|---|---|---|
| Non-conductive particle type | Barium sulfate | Alumina | Barium sulfate | Barium sulfate |
| Specific surface area | 5.5 | 5.0 | 5.5 | 5.5 |
| Particle size | 0.5 μm | 0.55 μm | 0.5 μm | 0.5 μm |
| Acrylamide amount | 89.0 wt % | 89.5 wt % | 75 wt % | CMC (D1220) |
| Acid group unit type | MAA | MAA | MAA |  |
| Acid group unit amount | 9 wt % | 9 wt % | 9.8 wt % |  |
| DMAA amount | 2.0 wt % | 1.5 wt % | 0.2 wt % |  |
| DMAEA amount | — | — | 15 wt % |  |
| Storage modulus | $6.50 \times 10^5$ | $6.6 \times 10^5$ | $1.4 \times 10^5$ | $6.75 \times 10^5$ |
| Tg | 167 | 168 | 140 | — |
| Molecular weight | 576000 | 361100 | 332500 | — |
| Viscosity | 38 | 30 | 26 | 82 |
| Application property | Favorable | Favorable | Favorable | Streaks |
| Moisture content in porous membrane | A | C | A | D |
| Thermal shrinkage resistance | A | A | C | A |
| High-temperature cycle | A | B | B | B |
| Cell volume | A | C | B | D |
| Halogen trapping amount | A | B | A | C |

Abbreviations in the tables mean as follows.

Specific surface area: specific surface area of non-conductive particle, unit g/m².

Particle size: particle size of non-conductive particle, unit μm.

Acrylamide amount: ratio of acrylamide in monomer composition for preparing water-soluble polymer (A), unit % by weight.

Acid group unit type: type of acid group-containing monomer in monomer composition for preparing water-soluble polymer (A). MAA: methacrylic acid. SAS(D): methallylsulfonic acid soda.

Acid group unit amount: ratio of acid group-containing monomer in monomer composition for preparing water-soluble polymer (A), unit % by weight.

DMAA amount: ratio of dimethylacrylamide in monomer composition for preparing water-soluble polymer (A), unit % by weight.

DMAEA amount: ratio of dimethylaminoethyl acrylate in monomer composition for preparing water-soluble polymer (A), unit % by weight.

Storage modulus: storage modulus of water-soluble polymer (A), unit Pa.

Tg: glass transition temperature of water-soluble polymer (A), unit ° C.

Molecular weight: molecular weight of water-soluble polymer (A).

Viscosity: viscosity of composition for porous membranes, unit mPa·s.

As seen from the results in Table 1 to Table 2, in Examples using the composition for porous membranes having the specific water-soluble polymer (A), application property of the composition for porous membranes was favorable, the moisture content in the porous membrane was low, thermal shrinkage resistance of the porous membrane was favorable, high-temperature cycle property in the obtained battery was favorable, the change in volume of the cell was small, and many halogen atoms in the electrolytic solution were trapped. Although the moisture content of the porous membrane in Example 8 was high compared to other Examples and the change in volume of the cell was large, it is considered that this may be due to the use of alumina as the non-conductive particle. However, the use of the water-soluble polymer (A) allowed the moisture content to become low compared to Comparative Example 3 including barium sulfate and carboxymethyl cellulose.

The invention claimed is:

1. A composition for a porous membrane of a secondary battery, comprising a non-conductive particle and a water-soluble polymer, wherein
   the water-soluble polymer contains 80% by weight or more of a (meth)acrylamide monomer unit, and
   the water-soluble polymer has a storage modulus at 150° C. of $2.0 \times 10^5$ Pa or more.

2. The composition for a porous membrane of a secondary battery according to claim 1, wherein a glass transition temperature obtained by measuring dynamic viscoelasticity of the water-soluble polymer is 150 to 200° C.

3. The composition for a porous membrane of a secondary battery according to claim 1, wherein the water-soluble polymer has a weight average molecular weight of $2.0 \times 10^5$ to $1.00 \times 10^6$.

4. The composition for a porous membrane of a secondary battery according to claim 1, wherein the water-soluble polymer contains an acid group-containing monomer unit.

5. A porous membrane for a secondary battery, obtained by forming a layer of the composition for a porous membrane of a secondary battery according to claim 1, and drying the formed layer.

6. A secondary battery comprising the porous membrane for a secondary battery according to claim 5.

* * * * *

EX PARTE REEXAMINATION CERTIFICATE (11765th)

United States Patent
Toyoda et al.

(10) Number: US 9,917,287 C1
(45) Certificate Issued: Dec. 8, 2020

(54) SECONDARY-BATTERY POROUS MEMBRANE COMPOSITION, SECONDARY-BATTERY POROUS MEMBRANE AND SECONDARY BATTERY

(71) Applicant: ZEON CORPORATION, Tokyo (JP)

(72) Inventors: Yujiro Toyoda, Tokyo (JP); Hiromi Takamatsu, Tokyo (JP)

(73) Assignee: ZEON CORPORATION, Tokyo (JP)

Reexamination Request:
No. 90/014,547, Jul. 31, 2020

Reexamination Certificate for:
Patent No.: 9,917,287
Issued: Mar. 13, 2018
Appl. No.: 15/114,949
PCT Filed: Feb. 3, 2015
PCT No.: PCT/JP2015/053010
§ 371 (c)(1),
(2) Date: Jul. 28, 2016
PCT Pub. No.: WO2015/122322
PCT Pub. Date: Aug. 20, 2015

(30) Foreign Application Priority Data

Feb. 14, 2014 (JP) .................. 2014-026775

(51) Int. Cl.
*H01M 2/16* (2006.01)
*C08J 7/04* (2020.01)
*C08J 9/00* (2006.01)
*C09D 133/26* (2006.01)
*H01M 2/14* (2006.01)
*H01M 10/0525* (2010.01)

(52) U.S. Cl.
CPC ......... *H01M 2/1653* (2013.01); *C08J 7/0427* (2020.01); *C08J 9/0066* (2013.01); *C09D 133/26* (2013.01); *H01M 2/145* (2013.01); *H01M 2/166* (2013.01); *C08J 2323/06* (2013.01); *C08J 2333/26* (2013.01); *C08J 2433/02* (2013.01); *C08J 2433/26* (2013.01); *H01M 10/0525* (2013.01)

(58) Field of Classification Search
None
See application file for complete search history.

(56) References Cited

To view the complete listing of prior art documents cited during the proceeding for Reexamination Control Number 90/014,547, please refer to the USPTO's public Patent Application Information Retrieval (PAIR) system under the Display References tab.

*Primary Examiner* — Jerry D Johnson

(57) ABSTRACT

A composition for a porous membrane of a secondary battery including a non-conductive particle and a water-soluble polymer, wherein the water-soluble polymer contains 80% by weight or more of a (meth)acrylamide monomer unit, and the water-soluble polymer has a storage modulus at 150° C. of $2.0 \times 10^5$ Pa or more; and a porous membrane manufactured therefrom and a secondary battery including the same.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 4 are cancelled.

Claim 1 is determined to be patentable as amended.

Claims 2, 5 and 6, dependent on an amended claim, are determined to be patentable.

New claims 7 and 8 are added and determined to be patentable.

1. A composition for a porous membrane of a secondary battery, comprising a non-conductive particle and a water-soluble polymer, wherein
    the water-soluble polymer contains [80%] *85%* by weight or more of a (meth)acrylamide monomer *unit and 0.1% by weight or more of an acid group-containing unit*, and
    the water-soluble polymer has a storage modulus at 150° C. of $2.0 \times 10^5$ Pa or more *and a weight average molecular weight of $2.0 \times 10^5$ to $6.0 \times 10^5$*.

7. *The composition for a porous membrane of a secondary battery according to claim 1, wherein the water-soluble polymer further contains a crosslinkable monomer unit, a ester unit, or both thereof,*
    *the ester unit being a unit having a structure that is formed by polymerization of an ester monomer, the ester monomer being an ester of (meth)acrylic acid and tertiary amino alcohol.*

8. *A separator for secondary battery comprising a separator substrate, and the porous membrane of claim 5 formed thereon.*

\* \* \* \* \*